(12) United States Patent
Endo et al.

(10) Patent No.: US 9,896,122 B2
(45) Date of Patent: Feb. 20, 2018

(54) STEERING CONTROL DEVICE, AND STEERING CONTROL METHOD

(71) Applicant: MITSUBISHI ELECTRIC CORPORATION, Tokyo (JP)

(72) Inventors: Masaya Endo, Tokyo (JP); Yoshihiko Kimpara, Tokyo (JP); Kenji Ogawa, Tokyo (JP); Taizo Toda, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 14/768,096

(22) PCT Filed: Apr. 8, 2013

(86) PCT No.: PCT/JP2013/060634
§ 371 (c)(1),
(2) Date: Aug. 14, 2015

(87) PCT Pub. No.: WO2014/167629
PCT Pub. Date: Oct. 16, 2014

(65) Prior Publication Data
US 2015/0375777 A1    Dec. 31, 2015

(51) Int. Cl.
*B62D 5/04* (2006.01)

(52) U.S. Cl.
CPC ......... *B62D 5/0463* (2013.01); *B62D 5/0466* (2013.01)

(58) Field of Classification Search
CPC .... B60W 10/20; B60W 30/09; B60W 10/184; B60W 2520/125; B60W 50/16;
(Continued)

(56) References Cited

U.S. PATENT DOCUMENTS

2002/0007239 A1* 1/2002 Matsumoto ........ B60K 23/0808
                                                              701/41
2002/0192081 A1* 12/2002 Okada .................... B62D 5/062
                                                              417/213
(Continued)

FOREIGN PATENT DOCUMENTS

EP        1538065 A2       6/2005
JP        10-264833 A     10/1998
(Continued)

OTHER PUBLICATIONS

International Search Report of PCT/JP2013/060634, dated May 28, 2013. [PCT/ISA/210].
(Continued)

*Primary Examiner* — Anne M Antonucci
*Assistant Examiner* — Sanjeev Malhotra
(74) *Attorney, Agent, or Firm* — Sughrue Mion, PLLC; Richard C. Turner

(57) ABSTRACT

Provided is a steering control device, including: an actuator for applying a steering assist torque to a steering system of a vehicle; a vehicle turning state detection section for detecting a state amount representing a turning state of the vehicle; a steering-holding determination section for determining a steering-holding state of the steering system; a storing section for storing, when the steering-holding determination section determines that the steering system is in the steering-holding state, the state amount detected by the vehicle turning state detection section as a steering-holding determination state amount; a steering assist torque calculation section for calculating the steering assist torque based on an absolute value of the steering-holding determination state amount; and an actuator control section for controlling the actuator based on the calculated steering assist torque.

13 Claims, 15 Drawing Sheets

(58) Field of Classification Search
CPC ........ B62D 5/001; B62D 5/003; B62D 6/008;
B62D 15/025; B62D 5/008; B62D 5/006;
B62D 5/046; B62D 5/0481; B62D 7/18;
B60T 2201/08; B60T 2201/087; B60T
8/17557
USPC .......... 701/1, 41, 42, 48; 180/402, 428, 444,
180/446; 417/213
See application file for complete search history.

(56) References Cited

U.S. PATENT DOCUMENTS

| | | | |
|---|---|---|---|
| 2003/0164260 A1* | 9/2003 | Cole | B62D 3/12 180/428 |
| 2005/0016791 A1* | 1/2005 | Fukushima | B62D 6/008 180/446 |
| 2005/0061577 A1* | 3/2005 | Shimizu | B62D 5/0463 180/446 |
| 2005/0113999 A1* | 5/2005 | Tange | B60T 8/17557 701/41 |
| 2005/0121252 A1 | 6/2005 | Tsuchiya | |
| 2005/0205345 A1* | 9/2005 | Hayashi | B62D 15/0285 180/446 |
| 2006/0069481 A1* | 3/2006 | Kubota | B62D 5/0463 701/41 |
| 2006/0200290 A1* | 9/2006 | Chino | B62D 5/005 701/41 |
| 2007/0029129 A1* | 2/2007 | Shiozawa | B62D 6/04 180/446 |
| 2007/0205040 A1* | 9/2007 | Miyasaka | B62D 5/001 180/444 |
| 2007/0215405 A1* | 9/2007 | Tsutsumi | B62D 5/001 180/402 |
| 2007/0299580 A1* | 12/2007 | Lin | B60W 10/20 701/41 |
| 2008/0091320 A1* | 4/2008 | Sakai | B62D 15/0285 701/42 |
| 2008/0185213 A1* | 8/2008 | Mori | B62D 5/003 180/402 |
| 2009/0024279 A1* | 1/2009 | Takeda | B60W 50/16 701/41 |
| 2009/0037054 A1* | 2/2009 | Igarashi | B62D 5/008 701/42 |
| 2009/0192679 A1* | 7/2009 | Kobayashi | B62D 5/0463 701/42 |
| 2010/0211235 A1* | 8/2010 | Taguchi | B60T 7/22 701/1 |
| 2011/0196579 A1* | 8/2011 | Tokimasa | B60W 10/184 701/48 |
| 2013/0103262 A1* | 4/2013 | Okazaki | B62D 6/00 701/41 |
| 2013/0245890 A1* | 9/2013 | Kageyama | B62D 7/18 701/41 |
| 2014/0014433 A1* | 1/2014 | Kageyama | B62D 7/18 180/402 |
| 2014/0032051 A1* | 1/2014 | Ezoe | B62D 6/001 701/42 |
| 2015/0006033 A1* | 1/2015 | Sekiya | B62D 5/001 701/41 |
| 2015/0336606 A1* | 11/2015 | Shibuya | B60W 10/02 180/444 |

FOREIGN PATENT DOCUMENTS

| | | |
|---|---|---|
| JP | 2005-162105 A | 6/2005 |
| JP | 2007-118839 A | 5/2007 |
| JP | 2012-166769 A | 9/2012 |
| JP | 2013-14271 A | 1/2013 |
| WO | 2013/005092 A1 | 1/2013 |

OTHER PUBLICATIONS

Communication dated Dec. 13, 2016, from the European Patent Office in counterpart European Application No. 13882023.8.

* cited by examiner

STEERING CONTROL DEVICE, AND STEERING CONTROL METHOD

CROSS REFERENCE TO RELATED APPLICATIONS

This application is a National Stage of International Application No. PCT/JP2013/060634 filed Apr. 8, 2013, the contents of all of which are incorporated herein by reference in their entirety.

TECHNICAL FIELD

The present invention relates to a steering control device, and the like, for assisting steering by a driver.

BACKGROUND ART

In related-art steering control devices, a steering wheel return torque is generated by a motor in order to improve steering wheel return characteristics at the time when a driver releases a steering wheel from his/her hand at low vehicle speed.

In Patent Literature 1, a predefined function of a target return speed for a steering angle is selected based on an average feed speed and a vehicle speed, and drive control is performed by assist power generation means so that a return speed of the steering wheel becomes the calculated target return speed. The average feed speed is calculated based on a deviation between a steering angle at the start of the feed of the steering wheel and a steering angle at the end of the feed of the steering wheel and an elapsed time of the feed of the steering wheel.

In such a steering control device, the target return speed is changed through the feed of the steering wheel.

In Patent Literature 2, a steering-holding state of a steering wheel is determined based on a steering torque and a steering speed, and when it is determined that the steering is held, an output of steering wheel return control is set to be zero. In this manner, the steering torque is prevented from being increased at the time when the steering of the steering wheel is held.

CITATION LIST

Patent Literature

[PTL 1] JP 10-264833 A (pages 3 and 4, paragraphs 0015 to 0027, and FIG. 2 and FIG. 4)
[PTL 2] JP 2012-166769 A (pages 2 and 3, paragraphs 0002 to 0011, and FIG. 3)

SUMMARY OF INVENTION

Technical Problem

In the related-art steering control devices, however, the target return speed or the return torque cannot be appropriately adjusted depending on the magnitude of a state amount representing a turning state of the vehicle at the time when the driver releases the steering wheel from his/her hand or turns back the steering wheel, for example, depending on the magnitude of a steering angle at the time when the driver releases the steering wheel from his/her hand.

Accordingly, there has been a problem in that, when the feed speed is constant, and when the steering angle at the release of the steering wheel from the driver's hand is large, it takes time for the steering wheel to return to a neutral position.

When the target return speed shown in FIG. 4 of Patent Literature 1 is used, and when the steering angle at the release of the steering wheel from the driver's hand is small, the steering wheel may not return to the neutral position because a road surface reaction torque acting to return the steering wheel to the neutral position is small and an initial value of the target return speed is set to be 0.

When the target return speed is set so as to cause the target return speed to become larger as the magnitude of the steering angle becomes larger as disclosed in Patent Literature 1, and when the steering wheel is released from the driver's hand at a large steering angle, the road surface reaction torque acting to return the steering wheel to the neutral position is large, and both the road surface reaction torque and the return torque act thereon. Thus, an actual steering speed may be abruptly increased.

The increase in steering torque can be suppressed when it is determined that the steering is held, but the return torque is increased at the start of the feed of steering. Thus, the driver may have a feel of discomfort.

The present invention has been made in order to solve the problems as described above, and has an object of providing a steering control device and the like, which are capable of acquiring an appropriate steering assist torque irrespective of a position of a steering wheel at the time when a driver turns back the steering wheel or releases the steering wheel from his/her hand.

Solution to Problem

According to one embodiment of the present invention, there are provided a steering control device and the like, including: an actuator for applying a steering assist torque to a steering system of a vehicle; a vehicle turning state detection section for detecting a state amount representing a turning state of the vehicle; a steering-holding determination section for determining a steering-holding state of the steering system; a storing section for storing, when the steering-holding determination section determines the steering-holding state, the state amount detected by the vehicle turning state detection section as a steering-holding determination state amount; a steering assist torque calculation section for calculating the steering assist torque based on an absolute value of the steering-holding determination state amount; and an actuator control section for controlling the actuator based on the calculated steering assist torque.

Advantageous Effects of Invention

According to the one embodiment of the present invention, the steering assist torque may be changed depending on the magnitude of the steering-holding determination state amount. Consequently, an appropriate steering assist torque may be acquired irrespective of the position of the steering wheel at the time when the driver turns back the steering wheel or releases the steering wheel from his/her hand, and therefore an appropriate return of the steering wheel and an appropriate steering feeling may be realized.

DESCRIPTION OF EMBODIMENTS

Figure 1:
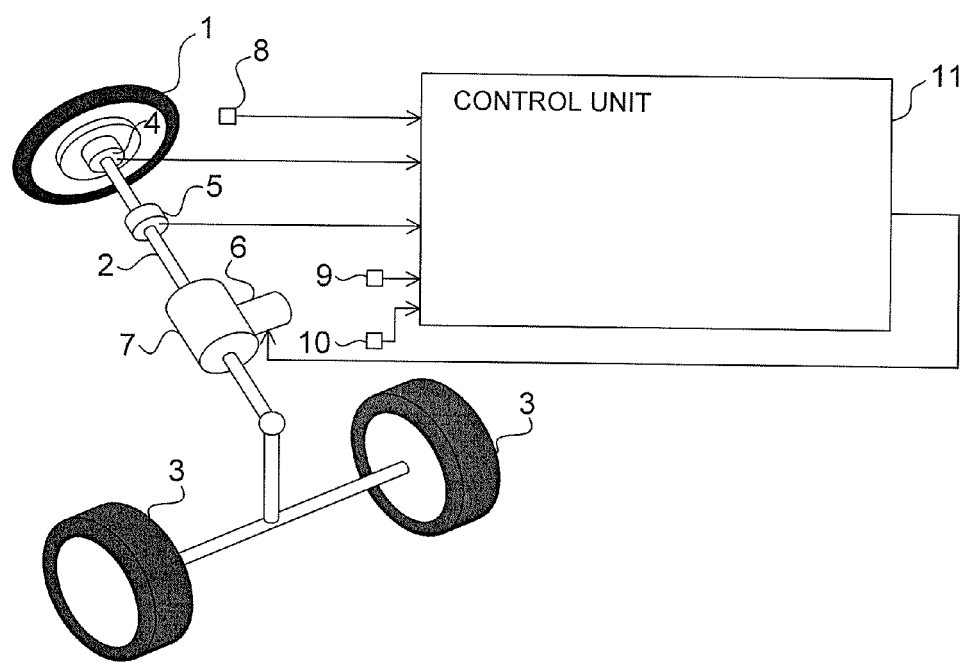
FIG. 1 is a diagram for illustrating an example of a configuration of a steering control device according to the present invention.

Referring to the drawings, a steering control device and the like according to the present invention are now described by way of embodiments. Note that, the same or corresponding parts in the respective embodiments are denoted by the same reference symbols, and a repetitive description thereof is omitted.

First Embodiment

FIG. 1 is a diagram for illustrating an example of a configuration of the steering control device according to the present invention. Right and left steered wheels 3 are steered in response to rotation of a steering shaft 2 coupled to a steering wheel 1. A steering angle sensor 4 for detecting a steering angle is mounted to the steering wheel 1. A torque sensor 5 is mounted to the steering shaft 2 to detect a steering torque acting on the steering shaft 2. A motor 6 is coupled to the steering shaft 2 via a speed reduction mechanism 7, and can apply a steering assist torque generated by the motor 6 to the steering shaft 2. A vehicle speed of a vehicle is detected by a vehicle speed sensor 8. A current flowing through the motor 6 is detected by a current sensor 9. An xinter-terminal voltage of the motor 6 is detected by a voltage sensor 10.

A control unit 11 calculates, for example, the steering assist torque to be generated by the motor 6, and controls the current of the motor 6 necessary for generating the steering assist torque. The control unit 11 includes a microcomputer (CPU) constructed by memories including a ROM and a RAM to be described later, a current driver for driving the motor current (causing a desired current to flow through the motor 6), and the like.

Next, the calculation of the steering assist torque by the control unit 11, which is a main part, according to this embodiment is described with reference to a block diagram illustrated in FIG. 2 and an operation flowchart illustrated in FIG. 3. Note that, the operation illustrated in the operation flowchart is repeatedly executed at a control cycle of a predetermined period.

Figure 2:
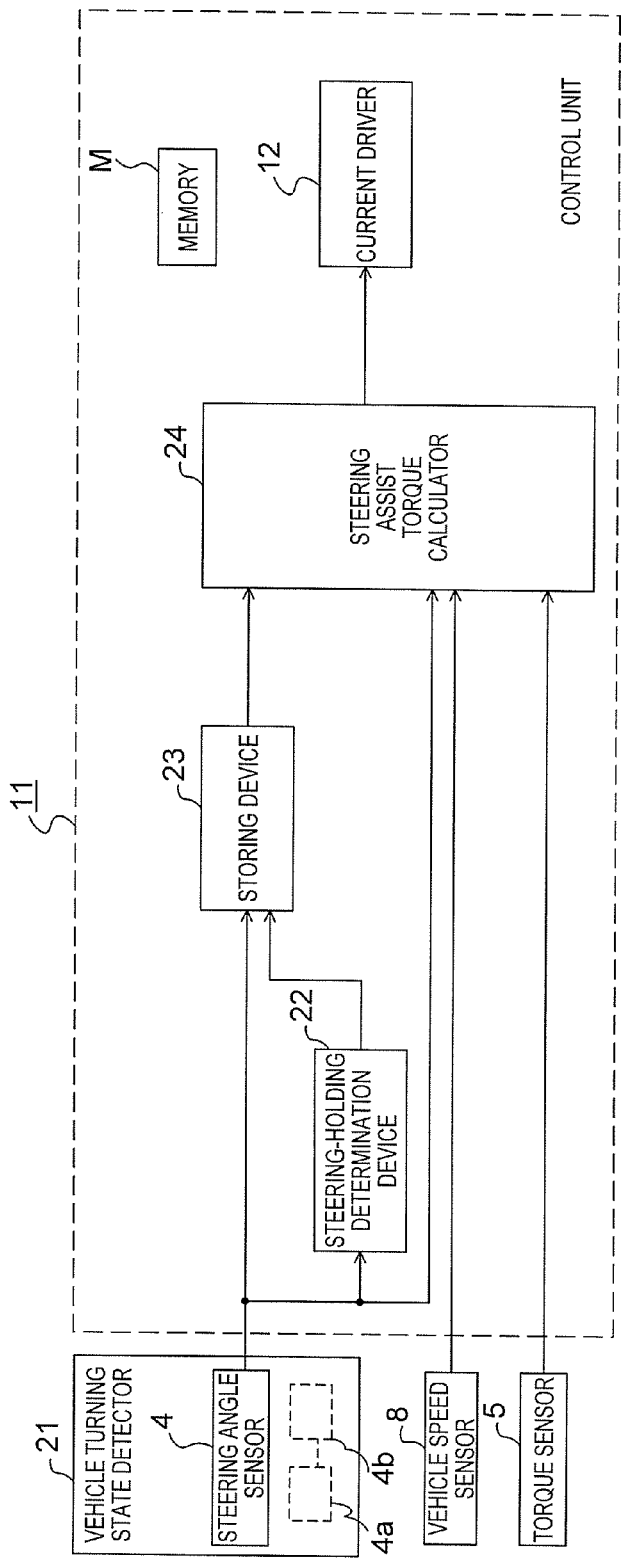
FIG. 2 is a block diagram for illustrating an example of a configuration of a main part of the steering control device according to a first embodiment and the like of the present invention.

In FIG. 2, the control unit 11 includes a steering-holding determination device 22, a steering assist torque calculator 24, a storing device 23, and a memory M, which are constructed by the microcomputer, and a current driver 12. Then, a vehicle turning state detector 21 including the steering angle sensor 4, for example, and the vehicle speed sensor 8 and the torque sensor 5 are connected to the control unit 11. The storing device 23 writes and reads necessary data to and from the memory M, which is a recording medium.

Figure 3:
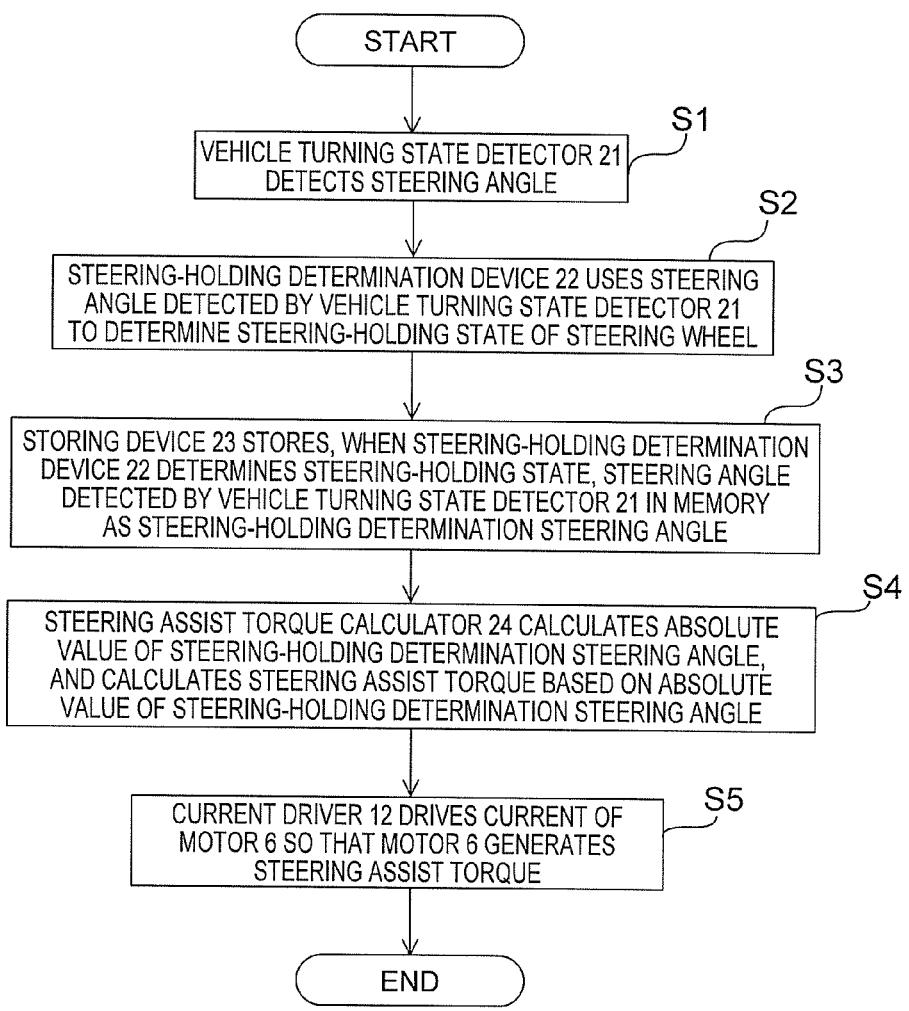
FIG. 3 is an operation flowchart for illustrating an example of an operation of the main part of the steering control device according to the first embodiment of the present invention.

In the operation flowchart of FIG. 3, in Step S1, the steering angle sensor 4 is used as the vehicle turning state detector 21 to detect a steering angle. In other words, in this embodiment, the steering angle is used as a state amount representing a turning state of the vehicle.

In Step S2, the steering-holding determination device 22 determines a steering-holding state of a steering system of the vehicle, that is, whether or not the steering wheel 1 remains at a substantially constant steering angle. In the steering-holding determination, the steering-holding determination device 22 uses the steering angle detected by the vehicle turning state detector 21 to calculate a steering speed based on the steering angle, and determines a situation in which the magnitude of the steering speed is smaller than a predetermined steering speed threshold as the steering-holding state.

In Step S3, the storing device 23 stores a value detected by the vehicle turning state detector 21 at the time when the steering-holding determination device 22 determines the steering-holding state in the memory M as a steering-holding determination state amount. In other words, in this embodiment, the storing device 23 stores the steering angle detected by the steering angle sensor 4 at the time when the steering-holding determination device 22 determines the steering-holding state in the memory M as a steering-holding determination steering angle (first stored value).

In the period until the steering-holding determination device 22 determines the steering-holding state for the first time, a predetermined stored value is stored in the memory M in advance as an initial value of the steering-holding determination steering angle. For example, the predetermined stored value is zero.

When the steering-holding determination device 22 newly determines the steering-holding state, the storing device 23 updates the stored steering-holding determination state amount, and stores the updated steering-holding determination state amount.

Even in a state in which the steering-holding determination device 22 has not newly determined the steering-holding state, when a certain condition is satisfied, the steering-holding determination device 22 updates the steering-holding determination state amount to a predetermined second stored value, and stores the predetermined second stored value. For example, the predetermined second stored value is zero. Even in a situation in which the steering speed is larger than the steering speed threshold, when the steering angle is equal to or smaller than a predetermined zero-determination threshold with which the steering angle can be determined to be almost zero, the steering-holding determination device 22 updates the steering-holding determination state amount to the second stored value as zero, and stores the second stored value.

In Step S4, the steering assist torque calculator 24 calculates the magnitude of the steering-holding determination state amount, that is, an absolute value of the steering-holding determination steering angle, and calculates a steering assist torque based on the absolute value of the steering-holding determination steering angle.

Figure 4:
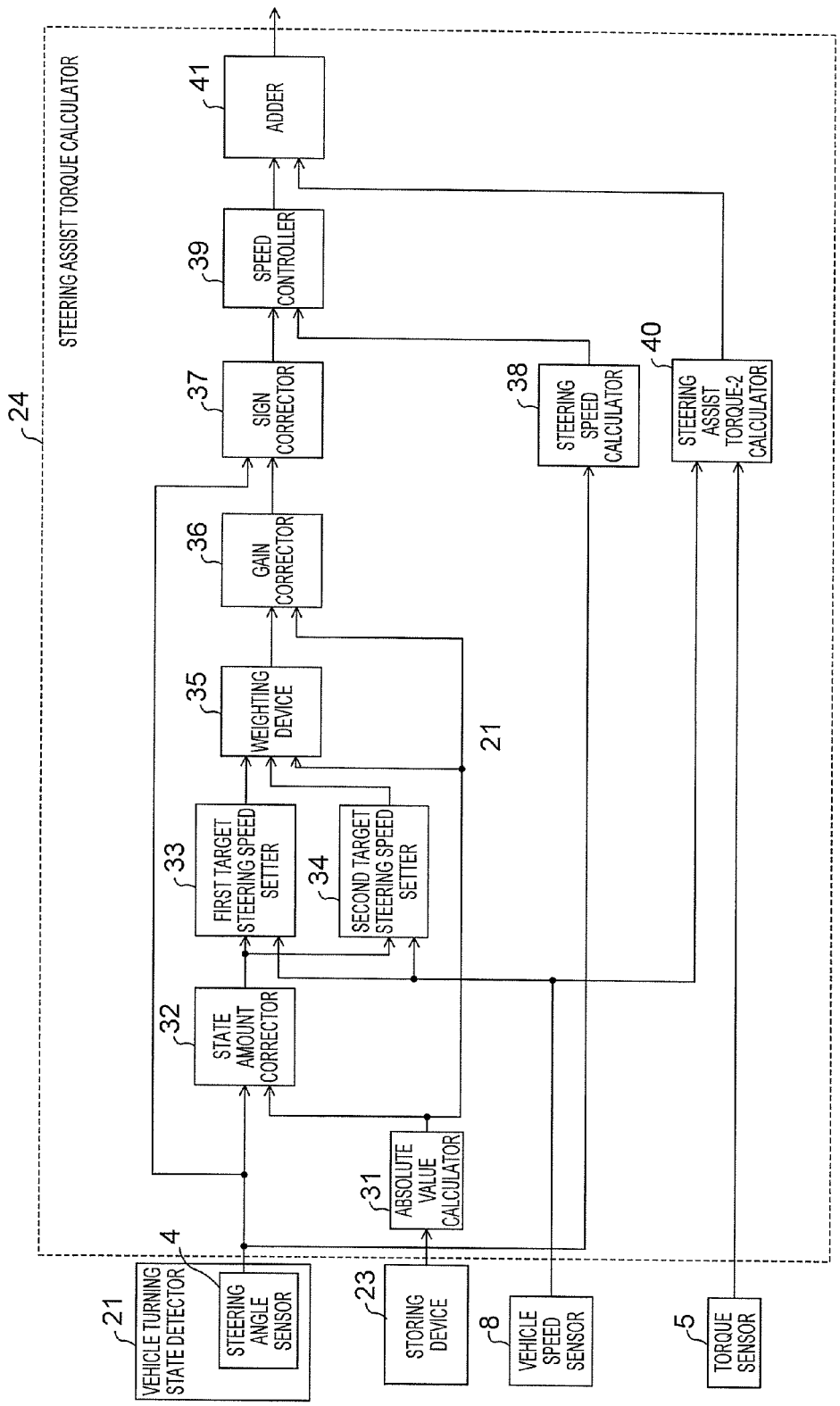
FIG. 4 is a block diagram for illustrating an example of a configuration of a steering assist torque calculator according to the first embodiment of the present invention.
Figure 5:
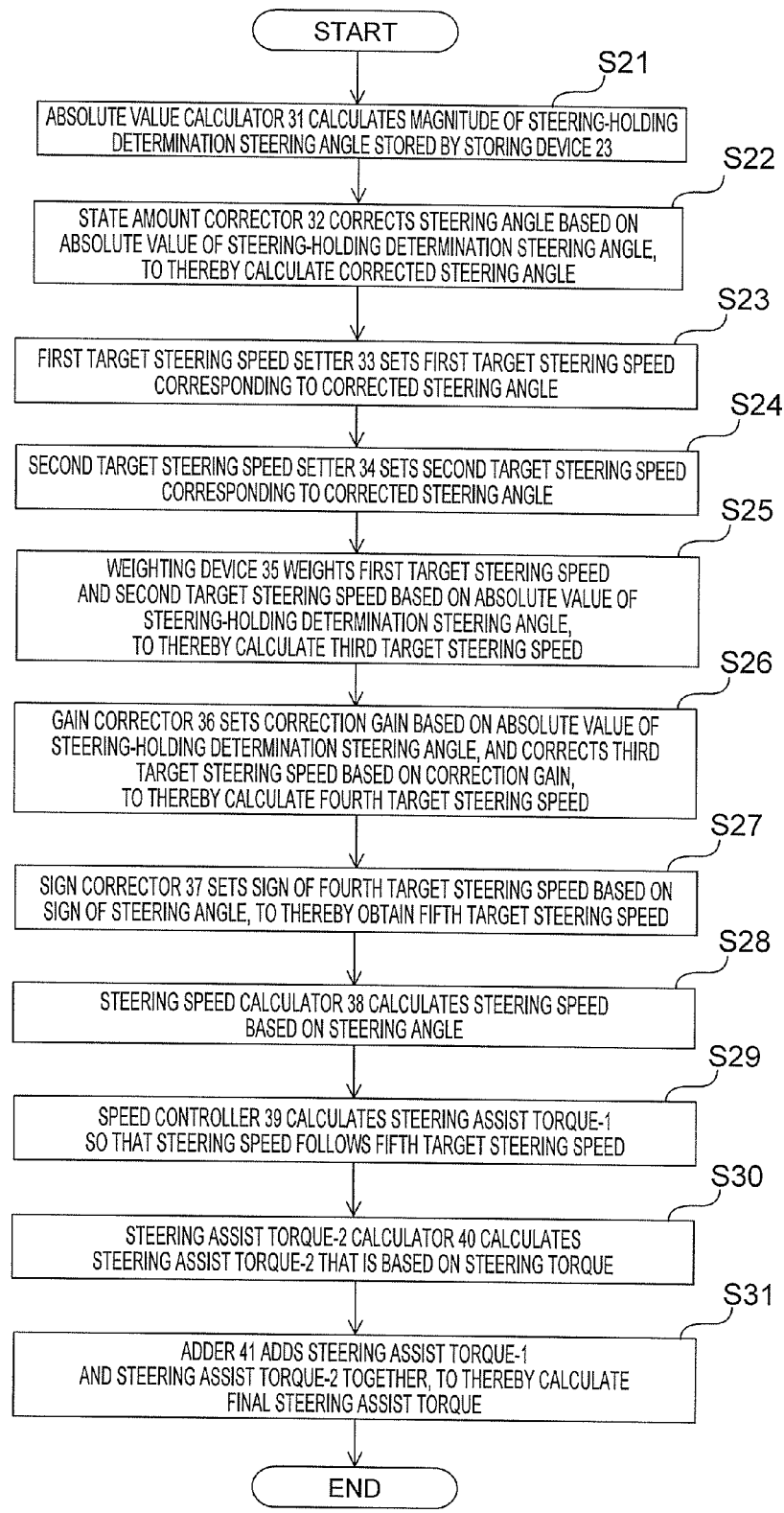
FIG. 5 is an operation flowchart for illustrating an example of an operation of the steering assist torque calculator according to the first embodiment of the present invention.

A block diagram of the steering assist torque calculator 24 is illustrated in FIG. 4, and an operation flowchart thereof is illustrated in FIG. 5. Note that, the operation illustrated in the operation flowchart is repeatedly executed at a control cycle of a predetermined period. In this embodiment, a steering angle is used as an input signal used in the steering assist torque calculator 24.

In FIG. 4, the steering assist torque calculator 24 includes an absolute value calculator 31, a state amount corrector 32, a first target steering speed setter 33, a second target steering speed setter 34, a weighting device 35, a gain corrector 36, a sign corrector 37, a steering speed calculator 38, a speed controller 39, a steering assist torque-2 calculator 40, and an adder 41.

In FIG. 5, in Step S21, the absolute value calculator 31 calculates the magnitude of the steering-holding determination state amount. In other words, the absolute value calculator 31 calculates the absolute value of the steering-holding determination state amount. In this embodiment, the absolute value calculator 31 calculates the absolute value of the steering-holding determination steering angle, which is stored in the memory by the storing device 23.

In Step S22, the state amount corrector 32 corrects the steering angle based on the absolute value of the steering-holding determination state amount, to thereby calculate the corrected steering angle. As a specific correction method, processing expressed by Expression (1) is performed.

$$\theta h1 = \theta h \times (\theta n/|\theta s|) \quad (1)$$

where $\theta h$ represents the steering angle, $\theta n$ represents a preset reference steering angle, $|\theta s|$ represents the absolute value of the steering-holding determination steering angle, and $\theta h1$ represents the corrected steering angle. The reference steering angle $\theta n$ may be stored in the memory in advance, and the stored reference steering angle $\theta n$ may be used.

Expression (1) represents the calculation of a steering angle corresponding to the case where the absolute value $|\theta s|$ of the steering-holding determination steering angle is corrected to be decreased or increased so as to match with the reference steering angle $\theta n$.

In Step S23, the first target steering speed setter 33 sets a first target steering speed corresponding to the corrected steering angle. In the first target steering speed setter 33, first target steering speed information corresponding to steering angles of from zero to the reference steering angle is stored in the memory M in advance as map information. Next, the first target steering speed setter 33 calculates a first target steering speed $d\theta ref1$ corresponding to the corrected steering angle $\theta h1$.

Figure 6:
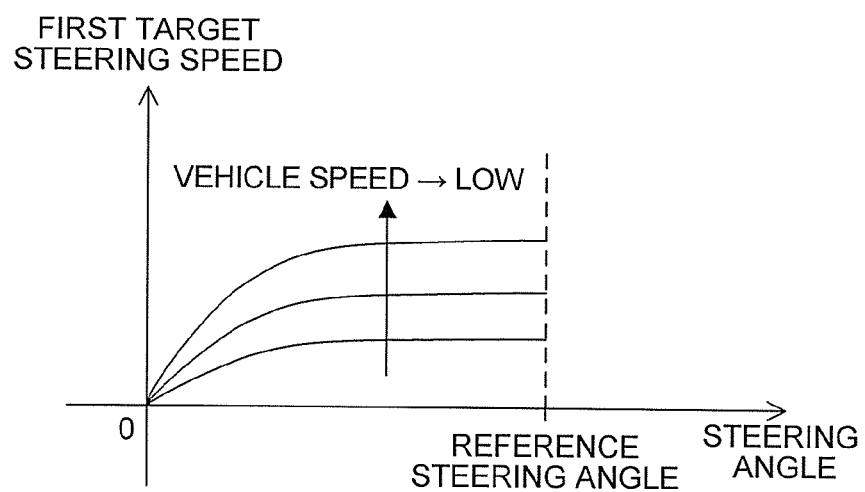
FIG. 6 is a graph for showing an example of map information of a first target steering speed setter according to the first embodiment of the present invention.

An example of the map information on the first target steering speed information is shown in FIG. 6. In the map information on the first target steering speed information, a target steering speed is stored in the memory in association with a vehicle speed Vel, and the first target steering speed is set depending on the corrected steering angle and the vehicle speed. The three curves of FIG. 6 represent the first target steering speeds corresponding to the steering angles of from zero to the reference steering angle for three kinds of vehicle speeds (the vehicle speed is lower in order from bottom to top), respectively. The first target steering speed has such characteristics that the target steering speed increases along with an increase in steering angle. The first target steering speed has such characteristics that the first target steering speed decreases along with an increase in vehicle speed.

Note that, the first target steering speed may be set as a function as expressed by Expression (2) instead of the map information.

$$d\theta ref1 = f1(\theta h1, Vel) \quad (2)$$

In Step S24, the second target steering speed setter 34 sets a second target steering speed $d\theta ref2$ corresponding to the corrected steering angle. In the second target steering speed setter 34, second target steering speed information corresponding to steering angles of from zero to the reference steering angle is stored in the memory M in advance as map information. Next, the second target steering speed setter 34 calculates the second target steering speed $d\theta ref2$ corresponding to the corrected steering angle $\theta h1$.

Figure 7:
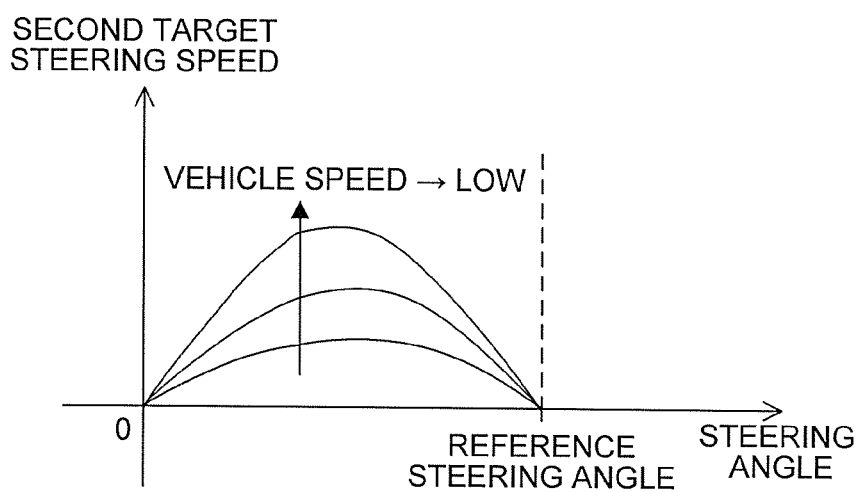
FIG. 7 is a graph for showing an example of map information of a second target steering speed setter according to the first embodiment of the present invention.

An example of the map information on the second target steering speed information is shown in FIG. 7. In the map information on the second target steering speed information, a target steering speed is stored in the memory in association with the vehicle speed Vel, and the second target steering speed is set depending on the corrected steering angle and the vehicle speed. The second target steering speed has such characteristics that the second target steering speed decreases along with an increase in vehicle speed. The three curves of FIG. 7 represent the second target steering speeds corresponding to the steering angles of from zero to the reference steering angle for three kinds of vehicle speeds (the vehicle speed is lower in order from bottom to top), respectively. The second target steering speed has such characteristics that, under the same vehicle speed, the second target steering speed first increases along with an increase in steering angle but subsequently decreases after reaching the maximum target steering speed.

Note that, the second target steering speed may be set as a function as expressed by Expression (3) instead of the map information.

$$d\theta ref2 = f2(\theta h1, Vel) \quad (3)$$

Note that, in the processing of Step S22, Step S23, and Step S24, the steering angle to be input to the map is corrected, but as an alternative to this processing, instead of the steering angle, preset steering angles on the horizontal axis in the map information, that is, steering angles of from zero to the reference steering angle may be corrected. It means that an input signal to be calculated is corrected depending on the magnitude of the steering-holding determination state amount, and the steering assist torque is calculated based on the corrected input signal.

Figure 8:
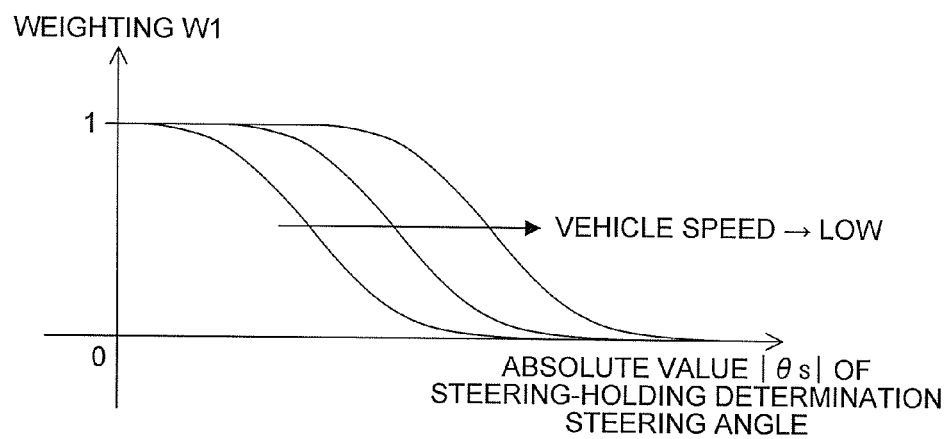
FIG. 8 is a graph for showing an example of a weighting used in a weighting device according to the first embodiment of the present invention.

In Step S25, the weighting device 35 weights the first target steering speed and the second target steering speed based on the absolute value |θs| of the steering-holding determination steering angle, to thereby calculate a third target steering speed. An example of a weighting W1 used in the weighting device 35 is shown in FIG. 8. Data on the weighting W1 is stored, for example, in the memory M in advance. Data of FIG. 8 is stored, for example, in the memory M in advance. The weighting W1 is set to be 1 in a region in which the absolute value of the steering-holding determination steering angle is small, and the weighting W1 is set so as to approach 0 as the absolute value of the steering-holding determination steering angle becomes larger. Further, W1 is changed depending on the vehicle speed. The three curves of FIG. 8 represent the weightings for three kinds of vehicle speeds (the vehicle speed is lower in order from left to right), respectively. In comparison under the same magnitude of the steering-holding determination steering angle, the weighting W1 becomes larger as the vehicle speed becomes lower. A third target steering speed dθref3 is calculated by Expression (4).

$$d\theta ref3 = W1 \times d\theta ref1 + (1-W1) \times d\theta ref2 \quad (4)$$

In other words, in the region in which the absolute value |θs| of the steering-holding determination steering angle is small, the first target steering speed dθref1 is mainly set as the third target steering speed dθref3, and in the region in which the absolute value |θs| of the steering-holding determination steering angle is large, the second target steering speed dθref2 is mainly set as the third target steering speed dθref3. For example, when W1=0.5 is established, the third target steering speed dθref3 is a target return speed obtained by averaging the first target steering speed dθref1 and the second target steering speed dθref2.

Note that, in this embodiment, the weighting W1 changes continuously from 0 to 1, but a switch (not shown) may be used or the steering-holding determination steering angle may be compared to a predetermined threshold so as to select one of the first target steering speed dθref1 and the second target steering speed dθref2 depending on the magnitude of the steering-holding determination steering angle, to thereby set the third target steering speed dθref3.

Figure 9:
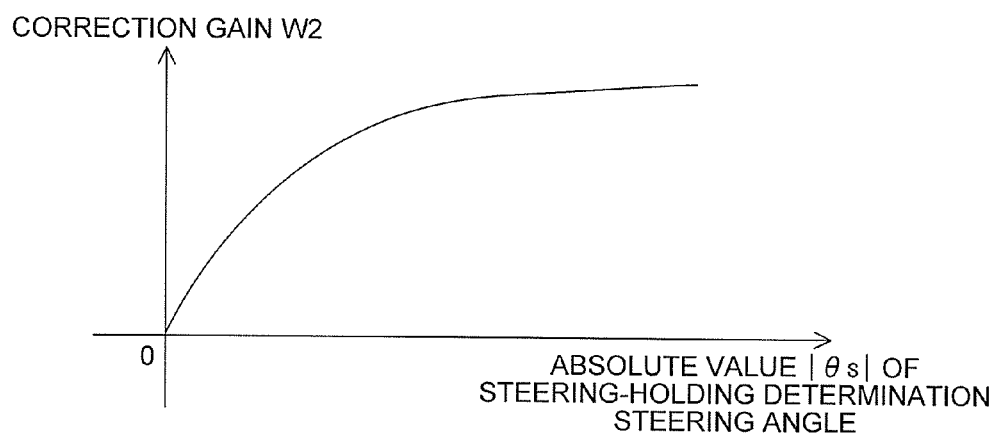
FIG. 9 is a graph for showing an example of a correction gain used in a gain corrector according to the first embodiment of the present invention.

In Step S26, the gain corrector 36 sets a correction gain based on the absolute value |θs| of the steering-holding determination steering angle, and corrects the third target steering speed dθref3 based on the correction gain, to thereby calculate a fourth target steering speed dθref4. An example of a correction gain W2 used in the gain corrector 36 is shown in FIG. 9. Data on the correction gain W2 is stored, for example, in the memory M in advance. In FIG. 9, the correction gain W2 is set so as to be larger as the absolute value |θs| of the steering-holding determination steering angle becomes larger. The fourth target steering speed dθref4 is calculated by Expression (5).

$$d\theta ref4 = W2 \times d\theta ref3 \quad (5)$$

In Step S27, the sign corrector 37 sets the sign of the fourth target steering speed dθref4 based on the sign of the steering angle, to thereby obtain a fifth target steering speed dθref5. In this embodiment, the target steering speed is used for the purpose of appropriately returning the steering wheel to a neutral position when the driver releases the steering wheel 1 from his/her hand or returns the steering wheel 1, namely a steering operation of returning the steering wheel from a certain steering angle toward the neutral position, and hence the sign of the target steering speed is set to be opposite to the sign of the steering angle.

In Step S28, the steering speed calculator 38 calculates a steering speed dθact based on the steering angle θh. Specifically, the steering speed calculator 38 calculates the steering speed by differentiating the steering angle detected by the steering angle sensor 4. Note that, the steering speed may be calculated by differentiating a rotation angle of the motor 6 and thereafter taking the speed reduction ratio of the speed reduction mechanism 7 into consideration. Alternatively, the steering speed may be estimated based on an induced voltage of the motor 6 (acquired from the voltage sensor 10) or the like.

In Step S29, the speed controller 39 calculates a steering assist torque-1 so that the steering speed follows the fifth target steering speed dθref5. For example, as expressed by Expression (6), a deviation between the target steering speed dθref5 and the steering speed dθact is multiplied by a feedback gain Kp to calculate the steering assist torque-1 (Ta1).

$$Ta1 = Kp \times (d\theta ref5 - d\theta act) \quad (6)$$

Further, after the steering assist torque-1 (Ta1) is calculated by Expression (6), the magnitude thereof is limited. For example, when the magnitude is equal to or larger than a threshold Ta1_max, the magnitude is limited to be Ta1_max. The threshold Ta1_max is set to such a magnitude that the driver is capable of steering the steering wheel 1 while resisting the steering assist torque-1 (Ta1).

Figure 10:
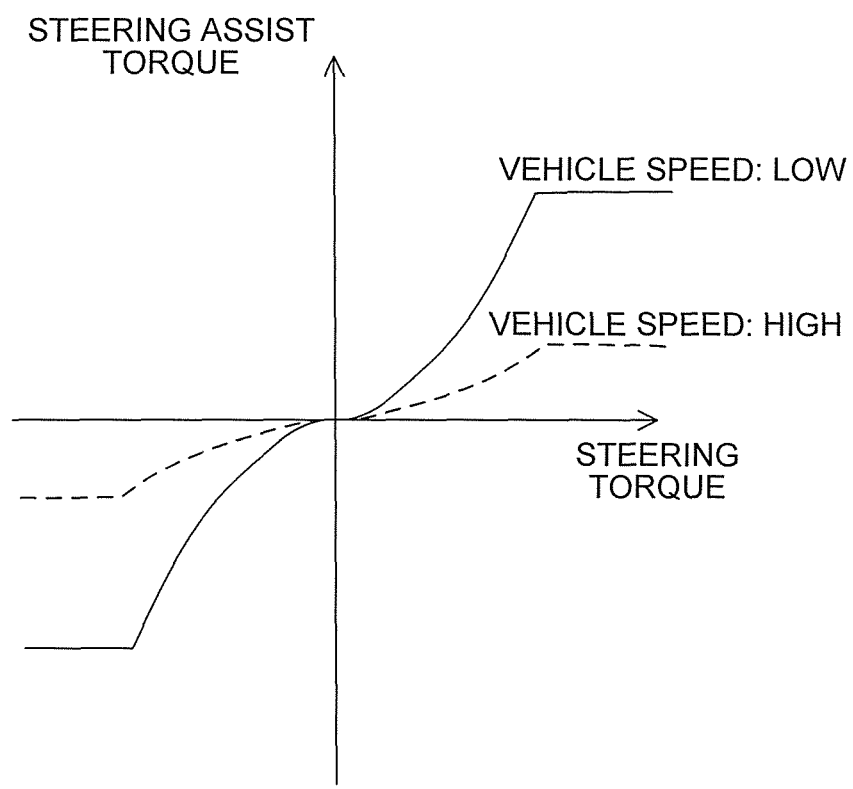
FIG. 10 is a graph for showing an example of an assist map according to the first embodiment of the present invention.

In Step S30, the steering assist torque-2 calculator 40 calculates a steering assist torque-2 that is based at least on the steering torque. For example, a relationship between the vehicle speed Vel and the steering assist torque-2 with respect to the steering torque as shown in an assist map of FIG. 10 is stored in the memory M in advance, and the steering assist torque-2 calculator 40 sets the steering assist torque-2 (Ta2) depending on the steering torque from the torque sensor 5 and the vehicle speed Vel from the vehicle speed sensor 8.

Then, in Step S31, the adder 41 adds the steering assist torque-1 (Ta1) and the steering assist torque-2 (Ta2) together, to thereby finally calculate the steering assist torque to be generated by the motor 6.

Returning to FIG. 3, after the steering assist torque calculator 24 finally calculates in Step S4 the steering assist torque to be generated by the motor 6 as described above, in Step S5, the current driver 12 drives the current of the motor 6 so that the motor 6 generates the calculated steering assist torque. In other words, the current driver 12 performs current control of the motor 6. In an actual case, the current driver 12 performs current control of the motor 6 so that the calculated steering assist torque is transmitted to the steering system via the speed reduction mechanism 7.

Specifically, the steering assist torque calculator 24 according to the first embodiment corrects the steering angle θh based on the absolute value |θs| representing the magnitude of the steering-holding determination steering angle, which is an example of the steering-holding determination state amount. Then, based on the corrected steering angle θh1, the first target steering speed dθref1, which is set to be larger as the steering angle becomes larger and the vehicle speed becomes lower and which is for use when the steering-holding determination steering angle is small, is set through predetermined first steering angle/target steering speed conversion, and the second target steering speed dθref2, which is set to be larger as the vehicle speed becomes lower and set to increase and decrease between the steering angle of zero and the reference steering angle so as to have a maximum value at an intermediate point therebetween and which is for use when the steering-holding determination steering angle is large, is set through predetermined second steering angle/target steering speed conversion.

Further, the first and second target steering speeds dθref1 and dθref2 are weighted by the weighting W1 so that the first target steering speed dθref1 is dominant in the region in which the absolute value of the steering-holding determination steering angle is small and that the second target steering speed dθref2 is dominant in the region in which the absolute value of the steering-holding determination steering angle is large, and the resultants are added together, to thereby set the third target steering speed dθref3. The third target steering speed dθref3 is then corrected by the correction gain W2, which becomes larger as the absolute value of the steering-holding determination steering angle becomes larger, to thereby set the fourth target steering speed dθref4. Then, the fifth target steering speed dθref5 obtained by converting the fourth target steering speed dθref4 to have the opposite sign is set.

Then, the deviation between the fifth target steering speed dθref5 and the steering speed dθact calculated based on the steering angle θh is multiplied by the feedback gain Kp, to thereby determine the steering assist torque-1 (Ta1) so that the steering speed follows the fifth target steering speed dθref5. Then, the steering assist torque-1 (Ta1) and the steering assist torque-2 (Ta2), which is determined from the assist map (FIG. 10) based on the vehicle speed and the steering torque, are added together to calculate the steering assist torque to be generated by the motor 6.

According to this embodiment as described above, when the driver additionally turns the steering wheel 1 from the neutral position, and then releases the steering wheel 1 from his/her hand or returns the steering wheel 1 at a certain steering angle, the steering speed always becomes zero. Consequently, the steering-holding determination device 22 can detect the start of the return steering including the release of the steering wheel from the driver's hand, that is, the turning-back of the steering wheel, and by storing the steering angle at the start of the return steering as the steering-holding determination steering angle, the turning state at the start of the return steering can be recognized.

The weighting device 35 is configured to weight the first target steering speed dθref1 and the second target steering speed dθref2 based on the absolute value of the steering-holding determination steering angle, to thereby calculate the third target steering speed dθref3, and hence an appropriate target steering speed can be set depending on the turning state at the time of the return steering.

First, in regard to the first target steering speed dθref1 to be selected in the region in which the steering-holding determination steering angle is small, the target steering speed is not zero when the driver releases the steering wheel from his/her hand, and hence the steering wheel 1 can be returned to the neutral position even in a region in which the road surface reaction torque is so small that the steering wheel 1 cannot be returned to the neutral position. When the return steering is performed from the region in which the steering-holding determination steering angle is small, the gradient in the assist map shown in FIG. 10 is small and the steering assist torque-2 (Ta2) is small in this region, and hence the steering assist torque-1 (Ta1) set by the first target steering speed dθref1 is more easily transmitted to the driver. The first target steering speed dθref1 has such characteristics that the target steering speed increases along with an increase in steering angle, and hence the driver's steering torque smoothly decreases as the steering angle becomes smaller, and an appropriate steering feeling can be realized.

Next, in regard to the second target steering speed dθref2 to be selected in the region in which the steering-holding determination steering angle is large, the target steering speed can be set to be zero or almost zero when the driver releases the steering wheel from his/her hand, and hence even in a situation in which the road surface reaction torque is large and the return speed is high, the steering assist torque-1 (Ta1) for suppressing the steering speed can be calculated, to thereby suppress an abrupt increase in return speed at the release of the steering wheel from the driver's hand. Further, when the steering is held in a region in which the steering angle is large, the target steering speed is almost zero and the steering speed is also almost zero. Thus, the steering assist torque-1 (Ta1) is small and the driver's steering torque is not changed, and hence an appropriate steering feeling can be realized. Also at the start of the return of steering, the target steering speed increases gradually from almost zero, and hence an abrupt increase in return torque can be prevented to realize a smooth change in steering torque, to thereby acquire an appropriate steering feeling.

The weighting is performed by W1, and hence even when the steering wheel is returned from an intermediate steering angle between the steering angles described above, the steering speed can be set to an appropriate target steering speed-1. In other words, an appropriate target steering speed and therefore an appropriate steering assist torque can be set in every steering region.

Further, the gain corrector 36 is configured to set the correction gain W2 based on the absolute value of the steering-holding determination steering angle, and correct the third target steering speed dθref3 based on the correction gain, to thereby calculate the fourth target steering speed dθref4, and hence the magnitude of the target steering speed can be adjusted depending on a steering angle at which the driver releases the steering wheel from his/her hand. Consequently, time until the steering wheel returns to the neutral position can be adjusted depending on the steering angle at which the driver releases the steering wheel from his/her hand, and, for example, when the time until the steering wheel returns to the neutral position is set substantially equal between the release from the driver's hand at a large steering angle and the release from the driver's hand at a small steering angle, an appropriate return of the steering wheel 1 can be realized.

In other words, with the configuration according to this embodiment, an appropriate steering assist torque can be acquired for the position of the steering wheel at the time when the driver turns back the steering wheel or releases the steering wheel from his/her hand, and therefore an appropriate return of the steering wheel and an appropriate steering feeling can be realized.

The first target steering speed setter 33 and the second target steering speed setter 34 are configured to set the target steering speeds (dθref1, dθref2) corresponding to the steering angle θh1 that is corrected by the state amount corrector 32 based on the absolute value |θs| of the steering-holding determination steering angle, and hence the amount of memory for the target steering speed information can be significantly reduced. If this system is not used, it is necessary to prepare target steering speed information corresponding to each magnitude of the steering-holding determination steering angle or set a function corresponding thereto, with the result that the amount of memory is increased.

The speed controller 39 limits the steering assist torque-1 (Ta1)) to such a magnitude that the driver is capable of steering the steering wheel 1 while resisting the steering assist torque-1 (Ta1), and hence the state in which the driver can always steer the steering wheel can be ensured.

The steering-holding determination device 22 is configured to update the steering-holding determination steering angle to the second stored value as zero and store the second stored value when the steering angle is almost zero, namely when the steering angle is equal to or smaller than the predetermined zero-determination threshold with which the steering angle is determinable to be almost zero, even in a situation in which the steering speed is larger than the steering speed threshold. Thus, when the driver performs the return steering so that the steering wheel 1 returns to the neutral position and subsequently performs the additional steering, the steering-holding determination steering angle can be set to be zero, and the target steering speed can be set to be zero. Consequently, the target steering speed can be prevented from being set larger than zero at the time of additional steering, thereby being capable of suppressing an increase in driver's steering torque.

Note that, in this embodiment, the steering angle detected by the steering state detector (vehicle turning state detector) 21 is used as the signal used in the steering-holding determination device 22, but the present invention is not limited thereto. It should be understood that a rotation angle or a rotation speed of the motor 6 can be used. Further, it is well-known art to estimate the steering angle based on a difference between right and left wheel speeds or a yaw rate or a lateral acceleration of the vehicle, and it can also be determined that the steering wheel is in the steering-holding state when a change amount of the estimated steering angle is small. Alternatively, it may be determined that the steering wheel is in the steering-holding state when a change amount of the steering torque detected by the torque sensor 5 is small.

In the cases as described above, as illustrated in FIG. 2, the vehicle turning state detector 21 includes a desired number of sensors 4a for detecting the above-mentioned respective factors, and a desired number of calculation sections 4b for calculating desired factors such as the steering angle based on detection signals from the sensors (the same applies hereinafter).

Further, in this embodiment, the input signal used in the steering assist torque calculator 24 and the state amount detected by the vehicle turning state detector 21 are the same. Consequently, the state amount corrector 32 can easily correct the state amount to be increased or decreased, thereby being capable of reducing the calculation load.

Second Embodiment

Figure 11:
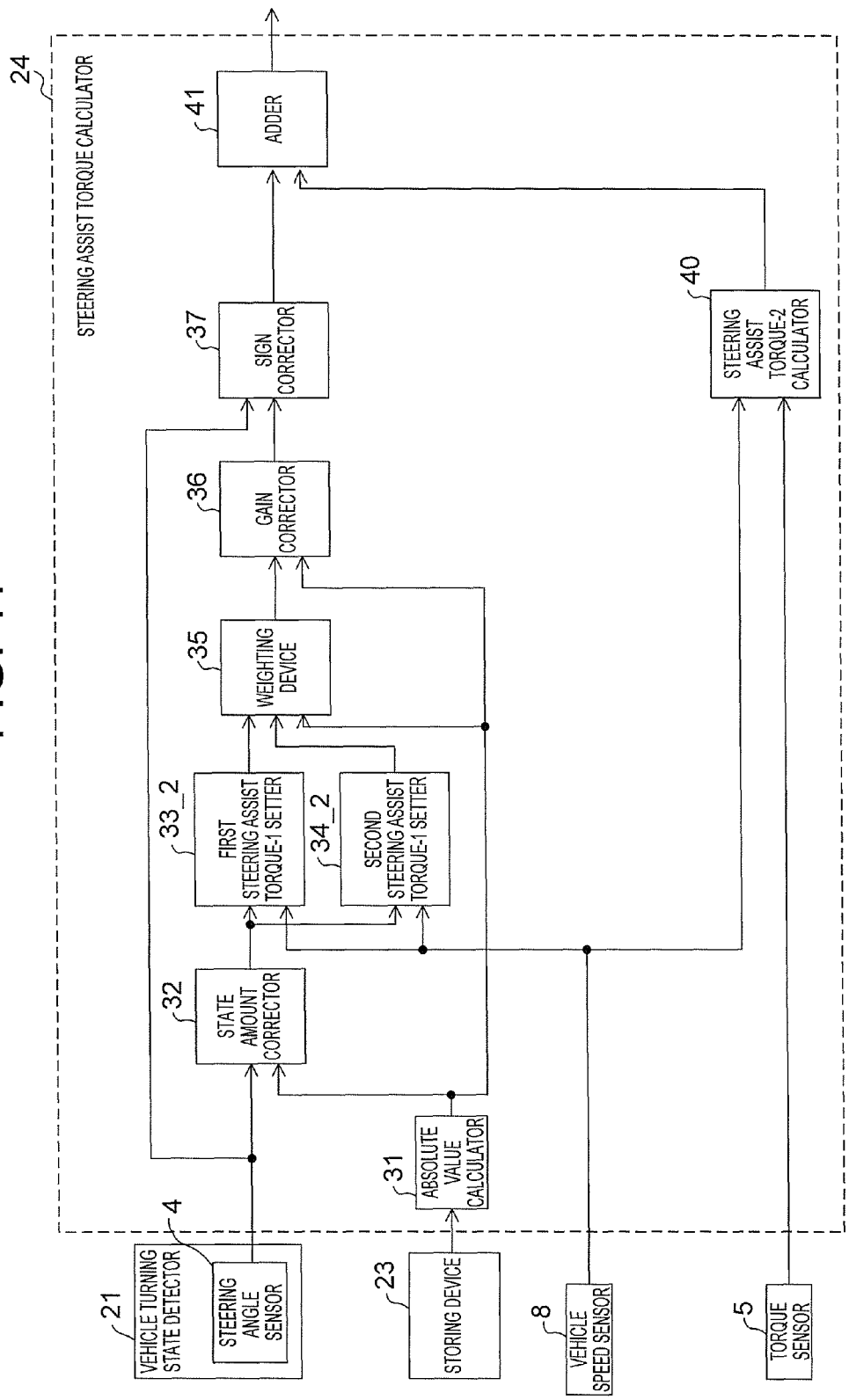
FIG. 11 is a block diagram for illustrating an example of a configuration of a steering assist torque calculator according to a second embodiment of the present invention.
Figure 12:
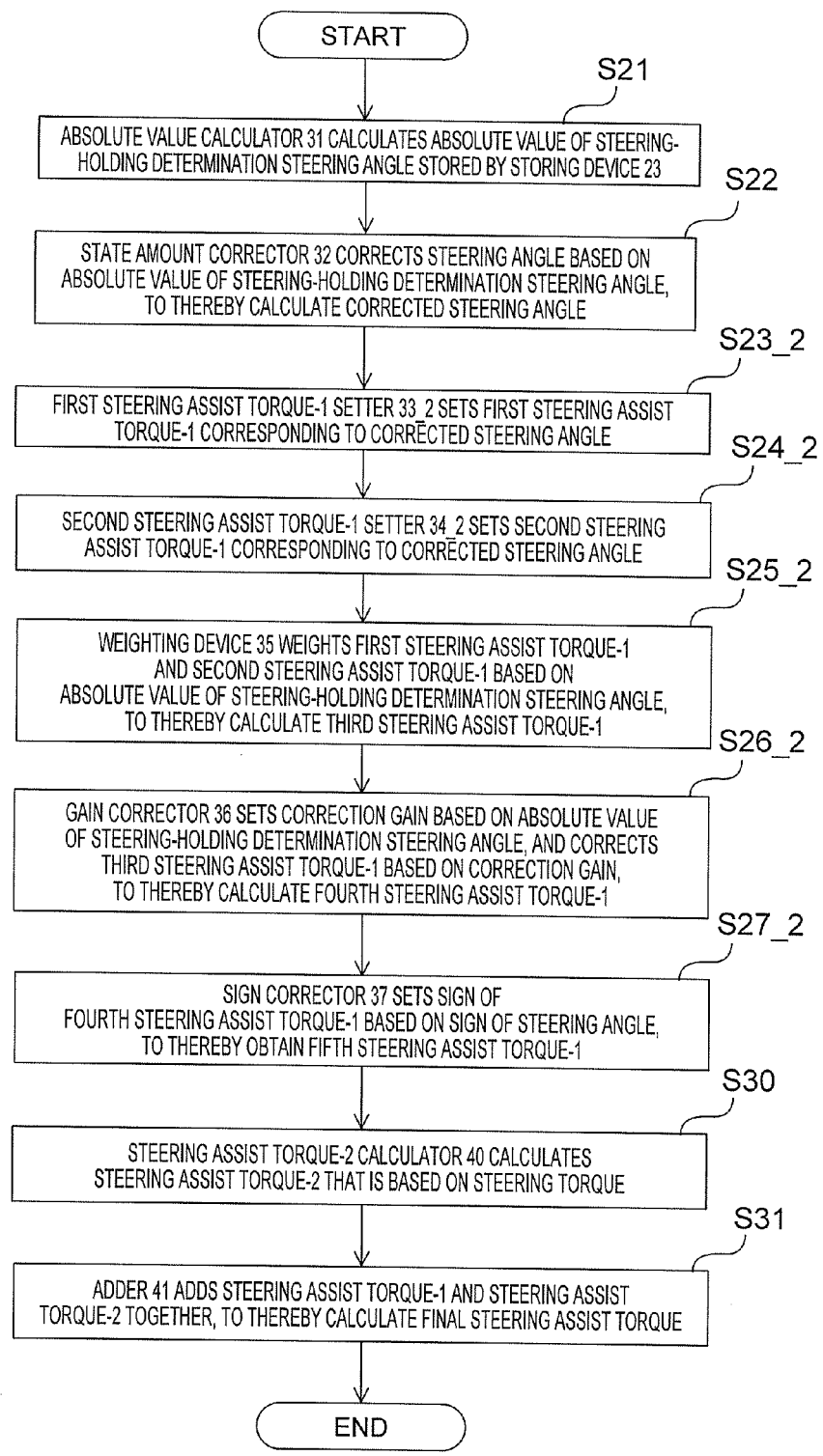
FIG. 12 is an operation flowchart for illustrating an example of an operation of the steering assist torque calculator according to the second embodiment of the present invention.

A block diagram of a steering assist torque calculator according to a second embodiment of the present invention is illustrated in FIG. 11, and an operation flowchart of the steering assist torque calculator is illustrated in FIG. 12. The other parts are basically the same as those in the above-mentioned embodiment. In this embodiment, a steering angle is used as an input signal used in the steering assist torque calculator.

As compared to FIG. 4, a steering assist torque calculator 24 of FIG. 11 includes a first steering assist torque-1 setter 33_2 and a second steering assist torque-1 setter 34_2 in place of the first target steering speed setter 33 and the second target steering speed setter 34. The steering speed calculator 38 and the speed controller 39 are not included.

Figure 13:
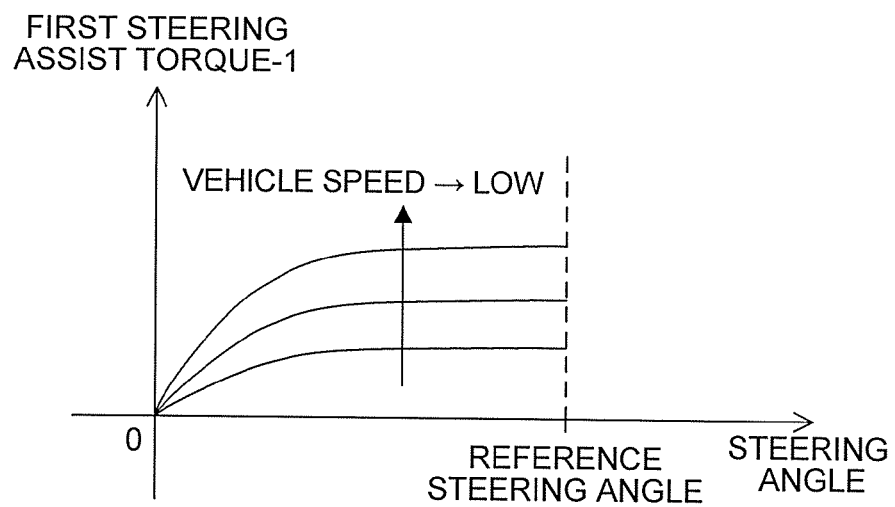
FIG. 13 is a graph for showing an example of map information of a first steering assist torque-1 setter according to the second embodiment of the present invention.

In FIG. 12, in Step S23_2, the first steering assist torque-1 setter 33_2 sets a first steering assist torque-1 (Ta1-1) corresponding to the corrected steering angle θh1. In the first steering assist torque-1 setter 33_2, information on the first steering assist torque-1 corresponding to steering angles of from zero to a reference steering angle is stored in the memory M in advance as map information. An example of the map information on the first steering assist torque-1 is shown in FIG. 13. Then, the first steering assist torque-1 setter 33_2 calculates the first steering assist torque-1 corresponding to the corrected steering angle θh1.

As shown in FIG. 13, the map information on the first steering assist torque-1 (Ta1-1) is stored in the memory M in association with the vehicle speed, and the first steering assist torque-1 is set depending on the corrected steering angle and the vehicle speed. The three curves of FIG. 13 represent the first steering assist torques-1 corresponding to the steering angles of from zero to the reference steering angle for three kinds of vehicle speeds (the vehicle speed is lower in order from the bottom to the top), respectively. The first steering assist torque-1 has such characteristics that the steering assist torque-1 increases along with an increase in steering angle. The first steering assist torque-1 has such characteristics that the first steering assist torque-1 decreases along with an increase in vehicle speed.

Note that, similarly to the above-mentioned embodiment, the first steering assist torque-1 may be set as a function instead of the map information.

Figure 14:
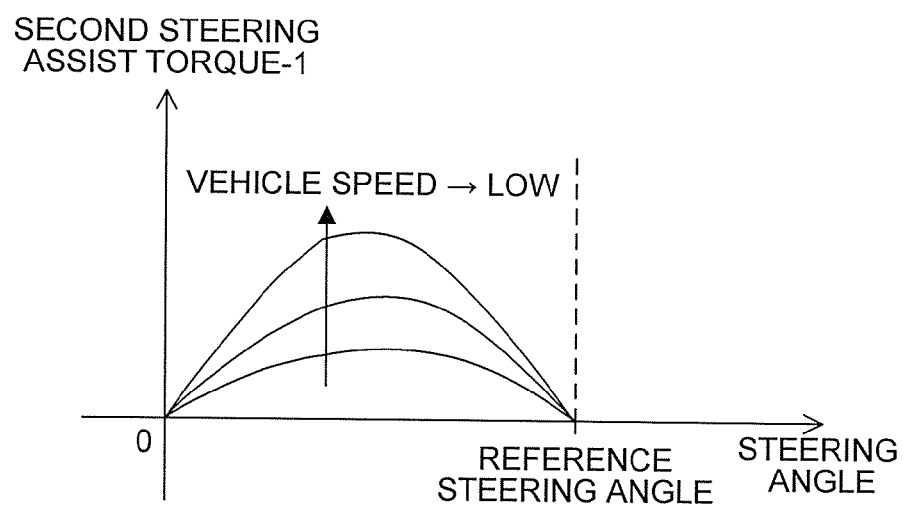
FIG. 14 is a graph for showing an example of map information of a second steering assist torque-1 setter according to the second embodiment of the present invention.

In Step S24_2, the second steering assist torque-1 setter 34_2 sets a second steering assist torque-1 (Ta1-2) corresponding to the corrected steering angle. In the second steering assist torque-1 setter 34_2, information on the second steering assist torque-1 corresponding to steering angles of from zero to a reference steering angle is stored in the memory M in advance as map information. An example of the map information on the second steering assist torque-1 is shown in FIG. 14. Then, the second steering assist torque-1 setter 34_2 calculates the second steering assist torque-1 corresponding to the corrected steering angle θh1.

As shown in FIG. 14, the map information on the second steering assist torque-1 (Ta1-2) is stored in the memory M in association with the vehicle speed, and the second steering assist torque-1 is set depending on the corrected steering angle and the vehicle speed. The three curves of FIG. 14 represent the second steering assist torques-1 corresponding to the steering angles of from zero to the reference steering angle for three kinds of vehicle speeds (the vehicle speed is lower in order from the bottom to the top), respectively. The second steering assist torque-1 has such characteristics that the second steering assist torque-1 decreases along with an increase in vehicle speed. Further, the second steering assist torque-1 has such characteristics that, under the same vehicle speed, the second steering assist torque-1 first increases along with an increase in steering angle but subsequently decreases after reaching the maximum steering assist torque.

Note that, similarly to the above-mentioned embodiment, the second steering assist torque-1 may be set as a function instead of the map information.

Note that, in the processing of Step S22, Step S23_2, and Step S24_2, the steering angle to be input to the map is corrected, but as an alternative to this processing, instead of the steering angle, preset steering angles on the horizontal axis in the map information, that is, steering angles of from zero to the reference steering angle may be corrected.

In Step S25_2, the weighting device 35 follows Step S25 according to the above-mentioned embodiment to weight the first steering assist torque-1 (Ta1-1) and the second steering assist torque-1 (Ta1-2) based on the absolute value |θs| of the steering-holding determination steering angle, to thereby calculate a third steering assist torque-1 (Ta1-3).

In Step S26_2, the gain corrector 36 follows Step S26 according to the above-mentioned embodiment to set a correction gain based on the absolute value |θs| of the steering-holding determination steering angle, and correct the third steering assist torque-1 (Ta1-3) based on the correction gain, to thereby calculate a fourth steering assist torque-1 (Ta1-4).

In Step S27_2, the sign corrector 37 follows Step S27 according to the above-mentioned embodiment to set the sign of the fourth steering assist torque-1 (Ta1-4) based on the sign of the steering angle θh, to thereby obtain a fifth steering assist torque-1 (Ta1-5). In this embodiment, the fifth steering assist torque-1 (Ta1-5) serves as the steering assist torque 1 (Ta1). In this embodiment, the target steering speed is used for the purpose of appropriately returning the steering wheel to a neutral position when the driver releases the steering wheel 1 from his/her hand or returns the steering wheel 1, and hence the sign of the steering assist torque-1 is set to be opposite to the sign of the steering angle.

In Step S30, the steering assist torque-2 calculator 40 follows Step S30 according to the above-mentioned embodiment to calculate, in accordance with the assist map of FIG. 10, for example, the steering assist torque-2 (Ta2) that is based at least on the steering torque from the torque sensor 5.

In Step S31, the adder 41 adds the fifth steering assist torque-1 (Ta1) and the steering assist torque-2 (Ta2) together, to thereby finally calculate the steering assist torque to be generated by the motor 6.

After that, the processing returns to FIG. 3 according to the above-mentioned first embodiment. The above description with reference to FIG. 11 and FIG. 12 corresponds to Step S4 of FIG. 3. After the steering assist torque calculator 24 finally calculates in Step S4 the steering assist torque to be generated by the motor 6, in Step S5, the current driver 12 of FIG. 2 drives the current of the motor 6 so that the motor 6 generates the steering assist torque.

Specifically, in the steering assist torque calculator 24 according to the second embodiment, instead of the first target steering speed dθref1 and the second target steering speed dθref2 according to the first embodiment, the first steering assist torque-1 and the second steering assist torque-1 are set by a corresponding method. Then, the third to fifth steering assist torques-1 corresponding to the third to fifth target steering speeds, respectively, are set by a corresponding method. Then, the fifth steering assist torque-1 serves as the steering assist torque-1 (Ta1) according to the first embodiment, and is added with the steering assist torque-2 (Ta2) to calculate the steering assist torque to be generated by the motor 6.

According to this embodiment as described above, as compared to the first embodiment, the processing of Step S28 and Step S29 is unnecessary, and the calculation load on the CPU can be reduced. However, as described below, the same effects as those in the first embodiment can also be obtained.

The weighting device 35 is configured to weight the first steering assist torque-1 (Ta1-1) and the second steering assist torque-1 (Ta1-2) based on the absolute value of the steering-holding determination steering angle, to thereby calculate the third steering assist torque-1 (Ta1-3), and hence an appropriate steering assist torque-1 can be set depending on the turning state at the time of the return steering.

First, in regard to the first steering assist torque-1 (Ta1-1) to be selected in the region in which the steering-holding determination steering angle is small, the target steering speed is not zero when the driver releases the steering wheel from his/her hand, and hence the steering wheel 1 can be returned to the neutral position even in a region in which the road surface reaction torque is so small that the steering wheel 1 cannot be returned to the neutral position. When the return steering is performed from the region in which the steering-holding determination steering angle is small, the gradient in the assist map shown in FIG. 10 is small and the steering assist torque-2 (Ta2) is small in this region, and hence the steering assist torque-1 (Ta1) as the fifth steering assist torque-1 set by the first steering assist torque-1 (Ta1-1) is more easily transmitted to the driver. The first steering assist torque-1 (Ta1-1) has such characteristics that the first steering assist torque-1 (Ta1-1) increases along with an increase in steering angle, and hence the driver's steering torque smoothly decreases as the steering angle becomes smaller, and an appropriate steering feeling can be realized.

Next, in regard to the second steering assist torque-1 (Ta1-2) to be selected in the region in which the steering-holding determination steering angle is large, the steering assist torque-1 can be set to be zero or almost zero when the driver releases the steering wheel from his/her hand, and hence in a situation in which the road surface reaction torque is large and the return speed is high, it is possible to suppress an abrupt increase in return speed at the release of the steering wheel from the driver's hand. Further, when the steering is held in a region in which the steering angle is large, the steering assist torque-1 is set to be almost zero. Thus, the driver's steering torque is not changed, and hence an appropriate steering feeling can be realized. Also at the start of the return of steering, the target steering speed increases gradually from almost zero, and hence an abrupt increase in return torque can be prevented to realize a smooth change in steering torque, to thereby acquire an appropriate steering feeling.

The weighting is performed by W1, and hence even when the steering wheel is returned from an intermediate steering angle between the steering angles described above, an appropriate steering assist torque-1 can be set. In other words, an appropriate steering assist torque can be set in every steering region.

Further, the gain corrector 36 is configured to set the correction gain W2 based on the absolute value of the steering-holding determination steering angle, and correct the third steering assist torque-1 (Ta1-3) based on the correction gain, to thereby calculate the fourth steering assist torque-1 (Ta1-4), and hence the magnitude of the steering assist torque-1 can be adjusted depending on a steering angle at which the driver releases the steering wheel from his/her hand. Consequently, time until the steering wheel returns to the neutral position can be adjusted depending on the steering angle at which the driver releases the steering wheel from his/her hand, and, for example, when the time until the steering wheel returns to the neutral position is set substantially equal between the release from the driver's hand at a large steering angle and the release from the driver's hand at a small steering angle, an appropriate return of the steering wheel 1 can be realized.

In other words, with the configuration according to this embodiment, an appropriate steering assist torque can be acquired irrespective of the position of the steering wheel at the time when the driver turns back the steering wheel or releases the steering wheel from his/her hand, and therefore an appropriate return of the steering wheel and an appropriate steering feeling can be realized.

The first steering assist torque-1 setter 33_2 and the second steering assist torque-1 setter 34_2 are configured to set the steering assist torque-1 corresponding to the corrected steering angle θh1 that is corrected by the state amount corrector 32 based on the magnitude of the steering-holding determination steering angle, and hence the amount of memory for the information on the steering assist torque-1 can be significantly reduced. If this system is not used, it is necessary to prepare the information on the steering assist torque-1 corresponding to each magnitude of the steering-holding determination steering angle or set a function corresponding thereto, with the result that the amount of memory is increased.

The steering-holding determination device 22 is configured to update the steering-holding determination steering angle to the second stored value as zero and store the second stored value when the steering angle is almost zero, namely when the steering angle is equal to or smaller than the predetermined zero-determination threshold with which the steering angle is determinable to be almost zero, even in a situation in which the steering speed is larger than the steering speed threshold. Thus, when the driver performs the return steering operation so that the steering wheel 1 returns to the neutral position and subsequently performs the additional steering operation, the steering-holding determination steering angle can be set to be zero, and the steering assist torque-1 can be set to be zero. Consequently, the steering assist torque-1 can be prevented from being set larger than zero at the time of additional steering, thereby being capable of suppressing an increase in driver's steering torque.

Note that, in this embodiment, the steering angle sensor 4 is used as the vehicle turning state detector 21, and the steering angle sensor 4 is used also as an input signal used in the steering assist torque calculator 24, but another state amount representing the turning state of the vehicle may be used instead of the steering angle sensor 4.

For example, a yaw rate detected by a yaw rate sensor mounted to the vehicle is used as an input signal used in the vehicle turning state detector 21 and the steering assist torque calculator 24. With this configuration, the steering assist torque for returning the steering wheel 1 can be appropriately adjusted depending on a yaw rate at the start of the return of the steering wheel 1 or a yaw rate at the start of the release of the steering wheel 1 from the driver's hand, and therefore an appropriate return of the steering wheel and an appropriate steering feeling can be realized. Further, in the case where the vehicle travels straight forward on a traveling road surface having a cross slope, although the steering assist torque for returning the steering wheel may be generated because an offset amount of the steering angle is generated due to straight travel, when the yaw rate is used, the yaw rate is near zero, and hence the steering assist torque for returning the steering wheel is not generated. Consequently, there is an effect that the driver's steering torque can be prevented from fluctuating and an appropriate steering feeling can be realized.

Instead of the steering angle sensor 4, a lateral acceleration of the vehicle, a road surface reaction torque acting on the right and left steered wheels 3, or a steering torque may be used. With this configuration, the steering assist torque for returning the steering wheel 1 can be appropriately adjusted depending on the lateral acceleration, the road surface reaction torque, or the steering torque at the start of the return of the steering wheel or the start of the release of the steering wheel from the driver's hand, and therefore an appropriate return of the steering wheel and an appropriate steering feeling can be realized. The lateral acceleration, the road surface reaction torque, and the steering torque are the state amounts relating to the torque for returning the steering wheel 1 to a neutral position. In a region in which the steering angle is large and the torque for returning the steering wheel 1 to the neutral position is large, the steering assist torque for returning the steering wheel 1 can be set small. On the other hand, in a region in which the steering angle is small and the torque for returning the steering wheel 1 to the neutral position is small, the steering assist torque for returning the steering wheel 1 can be set large. Consequently, an appropriate steering assist torque can be acquired irrespective of the position of the steering wheel at the time when the driver turns back the steering wheel or releases the steering wheel from his/her hand, and therefore an appropriate return of the steering wheel and an appropriate steering feeling can be realized.

The yaw rate and the lateral acceleration of the vehicle, the road surface reaction torque acting on the right and left steered wheels 3, and the steering torque are state amounts representing the turning state of the vehicle similarly to the steering angle, but have such characteristics that change amounts thereof decrease along with an increase in sideslip angle of the steered wheels. Accordingly, when the vehicle travels on a slippery road surface, if the sideslip angle increases so that the vehicle becomes unstable, the change amounts of those state amounts become smaller. Accordingly, when the vehicle travels on a slippery road surface, if the sideslip angle increases, the steering-holding determination state amount is set smaller so that the proportion of the first steering assist torque-1 to the steering assist torque-1 becomes higher as compared to when the vehicle stably travels with a small sideslip angle. Consequently, the steering assist torque-1 for returning the steering wheel 1 to a neutral point is generated at the start of the return of the steering wheel 1 or the start of the release of the steering wheel 1 from the driver's hand, and hence there is an effect of facilitating the steering operation of returning the steering wheel 1 to the neutral point for stabilizing the vehicle.

Third Embodiment

Figure 15:
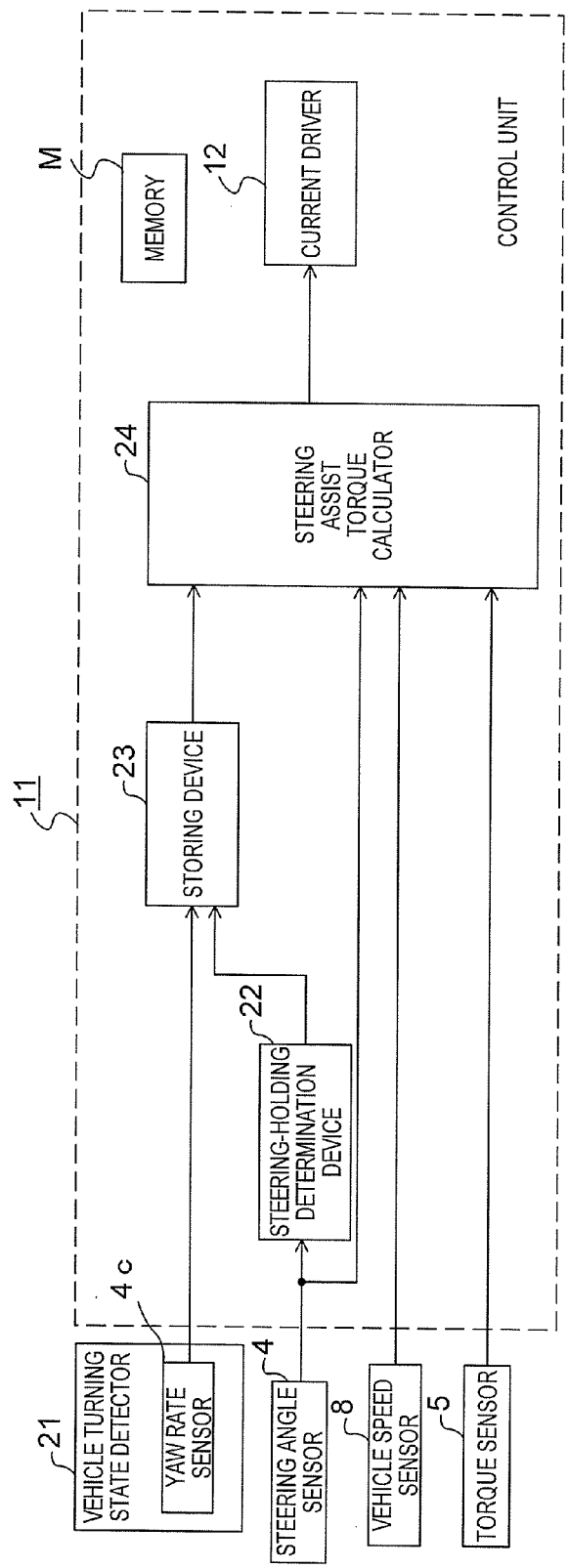
FIG. 15 is a block diagram for illustrating an example of a configuration of a main part of a steering control device according to a third embodiment of the present invention.
Figure 16:
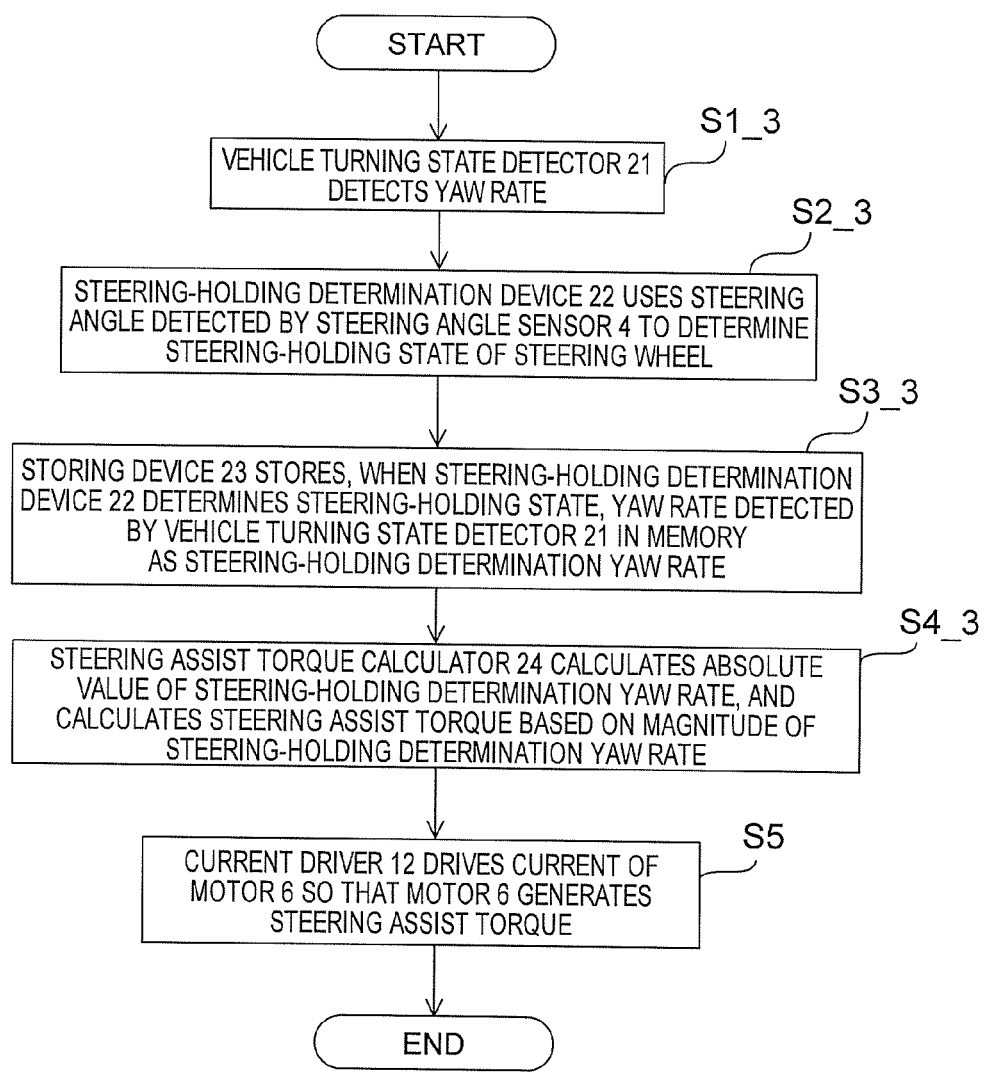
FIG. 16 is an operation flowchart for illustrating an example of an operation of the main part of the steering control device according to the third embodiment of the present invention.

A block diagram of a control unit, which is a main part of a steering control device, according to a third embodiment of the present invention is illustrated in FIG. 15, and an operation flowchart of the control unit is illustrated in FIG. 16. The other parts are basically the same as those in the above-mentioned embodiments. In this embodiment, as compared to the first embodiment, another state amount representing a turning state of the vehicle is used as the vehicle turning state detector 21 instead of the steering angle sensor 4.

As compared to FIG. 2, in a control unit 11 of FIG. 15, the vehicle turning state detector 21 includes a yaw rate sensor 4c, and the steering angle sensor 4 is separately mounted.

In FIG. 16, in Step S1_3, the yaw rate sensor 4c is used as the vehicle turning state detector 21 to detect a yaw rate. In other words, in this embodiment, the yaw rate is used as a state amount representing a turning state of the vehicle.

In Step S2_3, the steering-holding determination device 22 determines a steering-holding state of a steering system of the vehicle, that is, whether or not the steering wheel 1 remains at a substantially constant steering angle. In the steering-holding determination, the steering-holding determination device 22 uses the steering angle detected by the steering angle sensor 4 to calculate a steering speed based on the steering angle, and determines a situation in which the magnitude of the steering speed is smaller than a predetermined steering speed threshold as the steering-holding state.

In Step S3_3, the storing device 23 stores a value detected by the vehicle turning state detector 21 at the time when the steering-holding determination device 22 determines that the steering system is in the steering-holding state in the memory M as a steering-holding determination state amount. In other words, in this embodiment, the storing device 23 stores the yaw rate, at the time when the steering-holding determination device 22 determines that the steering system is in the steering-holding state, in the memory M as a steering-holding determination yaw rate.

In Step S4_3, the steering assist torque calculator 24 calculates the magnitude of the steering-holding determination state amount, that is, an absolute value of the steering-holding determination yaw rate, and calculates a steering assist torque based on the absolute value of the steering-holding determination yaw rate.

Figure 17:
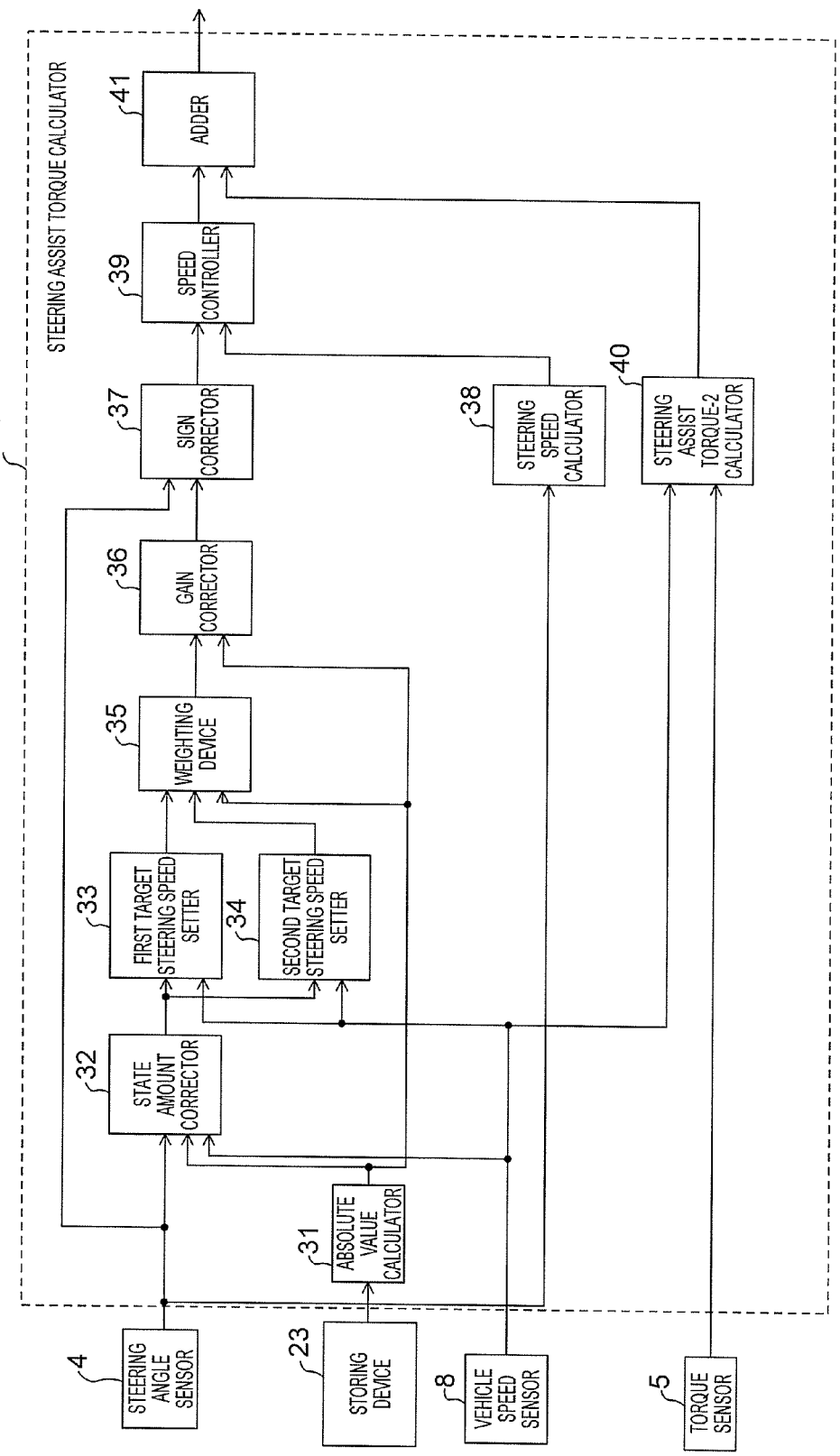
FIG. 17 is a block diagram for illustrating an example of a configuration of a steering assist torque calculator according to the third embodiment of the present invention.

A block diagram of the steering assist torque calculator 24 is illustrated in FIG. 17. The differences from the first embodiment reside in that the steering state detector (vehicle turning state detector) 21 is the yaw rate sensor (not shown in FIG. 17) and that a vehicle speed is used in the state amount corrector 32. A steering angle is used as an input signal used in the steering assist torque calculator 24.

The state amount corrector 32 corrects the steering angle θh based on the absolute value |θs| of the steering-holding determination state amount, to thereby calculate the corrected steering angle θh1. Note that, because the steering-holding determination state amount is the yaw rate unlike the first embodiment, based on the vehicle speed and the steering-holding determination yaw rate, a steering angle corresponding to the steering-holding determination yaw rate is calculated, and the calculated steering angle is determined as the steering-holding determination steering angle. Consequently, the steering angle used in the first target steering speed setter 33 and the second target steering speed setter 34 can be corrected by using Expression (1). In other words, the corrected steering angle θh1 is acquired.

In the steering assist torque calculator 24 according to the third embodiment, as the vehicle turning state detector 21 according to the first embodiment, the yaw rate sensor 4c representing the turning state of the vehicle is used instead of the steering angle sensor 4. The other parts are basically the same. Note that, the use of the yaw rate sensor 4c is applicable also to the other embodiments.

According to this embodiment as described above, the effects described in the first embodiment can be obtained. Further, in the case where the vehicle travels straight forward on a traveling road surface having a cross slope, when the yaw rate is used, the yaw rate is near zero and the steering-holding determination yaw rate is not offset, and hence the correction gain W2 set by the gain corrector 36 is small, and the steering assist torque for returning the steering wheel is not generated. Consequently, there is an effect that the driver's steering torque can be prevented from fluctuating and an appropriate steering feeling can be realized.

Note that, in this embodiment, the yaw rate sensor 4c is used as the vehicle turning state detector 21, but the present invention is not limited thereto. Another state amount representing the turning state of the vehicle can be used. For example, a lateral acceleration of the vehicle, a road surface reaction torque acting on the right and left steered wheels 3, or a steering torque may be used. With this configuration, the steering assist torque for returning the steering wheel 1 can be appropriately adjusted depending on the turning state of the vehicle such as the lateral acceleration, the road surface reaction torque, or the steering torque, and therefore an appropriate return of the steering wheel and an appropriate steering feeling can be realized.

The lateral acceleration, the road surface reaction torque, and the steering torque are state amounts relating to the torque for returning the steering wheel 1 to a neutral position. In a region in which the steering angle is large and the torque for returning the steering wheel 1 to the neutral position is large, the steering assist torque for returning the steering wheel 1 can be set small. On the other hand, in a region in which the steering angle is small and the torque for returning the steering wheel 1 to the neutral position is small, the steering assist torque for returning the steering wheel 1 can be set large. Consequently, an appropriate steering assist torque can be acquired irrespective of the position of the steering wheel at the time when the driver turns back the steering wheel or releases the steering wheel from his/her hand, and therefore an appropriate return of the steering wheel and an appropriate steering feeling can be realized.

The yaw rate and the lateral acceleration of the vehicle, the road surface reaction torque acting on the right and left steered wheels 3, and the steering torque are the state amounts representing the turning state of the vehicle similarly to the steering angle, but have such characteristics that change amounts thereof decrease along with an increase in sideslip angle of the steered wheels. Accordingly, when the vehicle travels on a slippery road surface, if the sideslip angle increases so that the vehicle becomes unstable, the change amounts of those state amounts become smaller. Accordingly, when the vehicle travels on a slippery road surface, if the sideslip angle increases, the steering-holding determination state amount is set smaller so that the proportion of the first steering assist torque-1 to the steering assist torque-1 becomes higher as compared to when the vehicle stably travels with a small sideslip angle. Consequently, the steering assist torque-1 for returning the steering wheel 1 to a neutral point is generated at the start of the return of the steering wheel 1 or the start of the release of the steering wheel 1 from the driver's hand, and hence there is an effect of facilitating the steering operation of returning the steering wheel 1 to the neutral point for stabilizing the vehicle.

Note that, this embodiment has been described for the differences from the first embodiment, but it should be understood that this embodiment can be combined with the second embodiment so that another state amount representing the turning state of the vehicle, such as the yaw rate sensor, is used as the steering state detector (vehicle turning state detector) 21.

As the steering state detector (vehicle turning state detector) 21, a plurality of state amounts each representing the turning state of the vehicle may be used. An effect obtained when the steering angle and the yaw rate are used, for example, is described. The yaw rate has such characteristics that a change amount thereof decreases along with an increase in sideslip angle of the steered wheels. Accordingly, when the vehicle travels on a slippery road surface, if the sideslip angle increases so that the change amount of the yaw rate decreases, the relationship between the steering-holding determination steering angle and the steering-holding determination yaw rate changes, that is, the ratio of the steering-holding determination yaw rate to the steering-holding determination steering angle becomes smaller as the sideslip angle becomes larger. In other words, with the use of the ratio of the steering-holding determination yaw rate to the steering-holding determination steering angle, a situation in which the vehicle is unstable with an increased sideslip angle can be determined, and the steering assist torque can be changed depending on the unstable situation of the vehicle.

Fourth Embodiment

Figure 18:
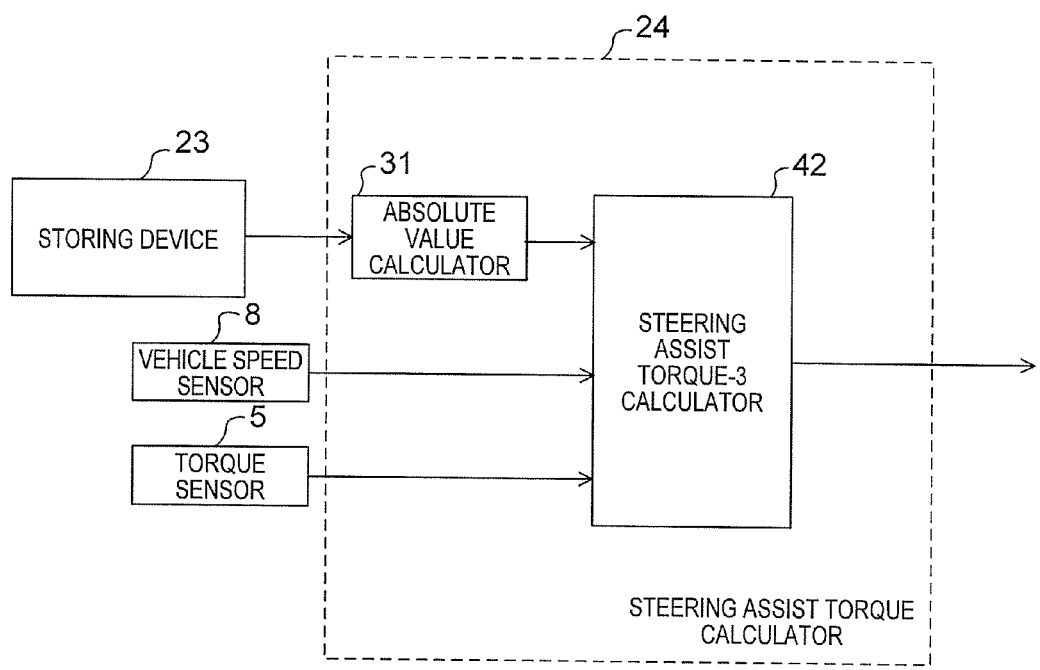
FIG. 18 is a block diagram for illustrating an example of a configuration of a steering assist torque calculator according to a fourth embodiment of the present invention.
Figure 19:
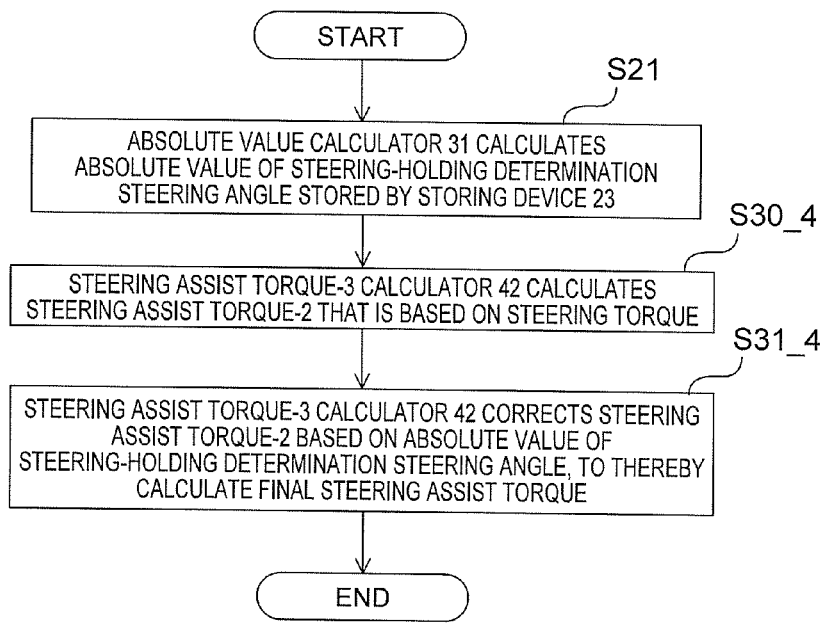
FIG. 19 is an operation flowchart for illustrating an example of an operation of the steering assist torque calculator according to the fourth embodiment of the present invention.

A block diagram of a steering assist torque calculator according to a fourth embodiment of the present invention is illustrated in FIG. 18, and an operation flowchart of the steering assist torque calculator is illustrated in FIG. 19. The other parts are basically the same as those in the above-mentioned embodiments. In this embodiment, as compared to the above-mentioned first to third embodiments, the steering assist torque calculator 24 corrects a steering assist torque-2 based on the magnitude of a steering-holding determination state amount.

The steering angle sensor 4 (see FIG. 2) is used as the vehicle turning state detector 21 to detect a steering angle. In other words, in this embodiment, the steering angle is used as a state amount representing a turning state of the vehicle.

The steering assist torque calculator 24 of FIG. 18 calculates the magnitude of the steering-holding determination state amount, that is, an absolute value of the steering-holding determination steering angle, and calculates the steering assist torque based on the absolute value of the steering-holding determination steering angle. An operation flowchart of the steering assist torque calculator 24 is illustrated in FIG. 19. The steering assist torque calculator 24 uses a steering torque as an input signal.

In Step S21 of FIG. 19, the absolute value calculator 31 calculates an absolute value $|\theta s|$ of the steering-holding determination steering angle stored by the storing device 23.

In Step S30_4, a steering assist torque-3 calculator 42 calculates the steering assist torque-2 that is based at least on the steering torque. For example, the vehicle speed and the steering assist torque-2 with respect to the steering torque as shown in the assist map of FIG. 10 are stored in the memory M in advance, and the steering assist torque-2 is set depending on the steering torque and the vehicle speed.

In Step S31_4, the steering assist torque-3 calculator 42 sets a correction gain W2 based on the absolute value $|\theta s|$ of the steering-holding determination steering angle, and multiplies the steering assist torque-2 by the correction gain W2, to thereby determine the final steering assist torque. For example, the same correction gain W2 as shown in FIG. 9 is used.

The steering assist torque calculator 24 according to the fourth embodiment sets the correction gain W2 based on the absolute value $|\theta s|$ of the steering-holding determination steering angle, and multiplies the steering assist torque-2 by the correction gain W2, to thereby determine the final steering assist torque.

Next, the effects of this embodiment are described on the assumption that the driver performs a steering operation of additionally turning the steering wheel 1 from a neutral position, turning back the steering wheel 1 at a certain steering angle, and returning the steering wheel 1 to the neutral position. Note that, in this embodiment, the steering assist torque-2 is set depending on the steering torque by using the assist map shown in FIG. 10, and accordingly serves as a steering assist torque for reducing the driver's steering torque.

When the driver additionally turns the steering wheel 1 from the neutral position, the steering-holding determination steering angle is near zero, and hence the correction gain W2 is almost zero. Thus, when the driver additionally turns the steering wheel 1 from the neutral position, the same steering assist torque-2 as that in the related art is calculated as the steering assist torque. Next, in the case of the steering operation of turning back the steering wheel 1 at a certain steering angle and returning the steering wheel 1 to the neutral position, the steering-holding determination steering angle of other than zero is set, and the correction gain W2 of other than zero is set. As a result, the steering assist torque-2 larger than that in the related art is calculated as the steering assist torque. Consequently, the steering assist torque when the steering wheel is returned can be changed with respect to that when the steering wheel is additionally turned. Further, an appropriate steering assist torque can be acquired for a steering angle at which the driver turns back the steering wheel 1 or a steering angle at which the driver releases the steering wheel 1 from his/her hand, and therefore an appropriate return of the steering wheel and an appropriate steering feeling can be realized.

Note that, in this embodiment, the steering assist torque-3 calculator 42 is configured to calculate the steering assist torque-2 that is based on the steering torque, but the present invention is not limited thereto. For example, a steering assist torque calculated by a related-art steering control device may be corrected based on the magnitude (absolute value) of the steering-holding determination steering angle. With this configuration, the steering assist torque calculated by the related-art steering control device may be appropriately set for a steering angle at which the driver turns back the steering wheel 1 or a steering angle at which the driver releases the steering wheel 1 from his/her hand, and therefore an appropriate steering feeling can be realized.

Note that, in this embodiment, the steering angle is used as the steering-holding determination state amount, but the present invention is not limited thereto. Another state amount representing the turning state of the vehicle may be used instead of the steering angle. For example, with the use of the road surface reaction torque, the correction gain W2 is set depending on a steering-holding determination road surface reaction torque. With this configuration, the steering assist torque can be appropriately set depending on a road surface reaction torque at the start of the return of the steering wheel or a road surface reaction torque at the start of the release of the steering wheel from the driver's hand, and therefore an appropriate return of the steering wheel and an appropriate steering feeling can be realized. The road surface reaction torque has such characteristics that a change amount thereof is saturated along with an increase in sideslip angle of the steered wheels. Accordingly, when the vehicle travels on a slippery road surface, if the sideslip angle increases so that the road surface reaction torque is saturated, the correction gain W2 is set small, and hence the steering assist torque-2 can be prevented from being set excessively large.

Note that, in the above-mentioned embodiments, the configuration including two target steering speed setters or two steering assist torque-1 setters has been described, but the present invention is not limited thereto.

For example, only one target steering speed setter or only one steering assist torque-1 setter may be mounted, and the weighting device 35 may be omitted. In this case, the range of adjusting the steering assist torque is limited, but the calculation load can be reduced, and the magnitude of the steering assist torque can be adjusted depending on the steering-holding determination state amount.

Alternatively, three or more target steering speed setters or three or more steering assist torque-1 setters may be mounted. As a result, the steering assist torque can be more finely adjusted depending on the position of the steering wheel at the time when the driver turns back the steering wheel or releases the steering wheel from his/her hand, and therefore an appropriate return of the steering wheel and an appropriate steering feeling can be realized.

Note that, the motor 6 and the speed reduction mechanism 7 serve as an actuator, the vehicle turning state detector 21 serves as a vehicle turning state detection section, the steering-holding determination device 22 serves as a steering-holding determination section, the storing device 23 and the memory M serve as a storing section, the steering assist torque calculator 24 serves as a steering assist torque calculation section, the vehicle speed sensor 8 serves as a vehicle speed detection section, and the current driver 12 serves as an actuator control section.

Further, the first steering assist torque setting information includes the first target steering speed or the first steering assist torque, the second steering assist torque setting information includes the second target steering speed or the second steering assist torque, and the reference steering assist torque includes the steering assist torque-2. The first to fifth target steering speeds correspond to the target return speeds.

The present invention is not intended to be limited to the above-mentioned embodiments, and it should be understood that the present invention includes all possible combinations of the embodiments.

INDUSTRIAL APPLICABILITY

The steering control device and the like according to the present invention are applicable to various kinds of steering devices, and similar effects are obtained.

REFERENCE SIGNS LIST

1 steering wheel, 2 steering shaft, 3 steered wheel, 4 steering angle sensor, 4*a* sensor, 4*b* calculation section, 4*c* yaw rate sensor, 5 torque sensor, 6 motor, 7 speed reduction mechanism, 8 vehicle speed sensor, 9 current sensor, 10 voltage sensor, 11 control unit, 12 current driver, 21 vehicle turning state detector, 22 steering-holding determination device, 23 storing device, 24 steering assist torque calculator, 31 absolute value calculator, 32 state amount corrector, 33 first target steering speed setter, 33_2 first steering assist torque-1 setter, 34 second target steering speed setter, 34_2 second steering assist torque-1 setter, 35 weighting device, 36 gain corrector, 37 sign corrector, 38 steering speed calculator, 39 speed controller, 40 steering assist torque-2 calculator, 41 adder, 42 steering assist torque-3 calculator

The invention claimed is:

1. A steering control device, comprising:
an actuator for applying a steering assist torque to a steering system of a vehicle;
a vehicle turning state detection section for detecting a state amount representing a turning state of the vehicle, the state amount being a steering angle of the steering system;
a steering-holding determination section for determining a steering-holding state of the steering system based on a steering speed obtained from the steering angle;
a storing section for storing, when the steering-holding determination section determines that the steering system is in the steering-holding state, the state amount detected by the vehicle turning state detection section as a steering-holding determination state amount;
a steering assist torque calculation section for calculating the steering assist torque based on an absolute value of the steering-holding determination state amount; and
an actuator control section for controlling the actuator based on the calculated steering assist torque,
wherein the steering assist torque calculation section stores in advance at least first steering assist torque setting information, which affects the steering assist torque when the steering angle at time of steering-holding determination is small, and second steering assist torque setting information, which affects the steering assist torque when the steering angle at the time of the steering-holding determination is large, and the first steering assist torque setting information or the second steering assist torque setting information is selected or weighted depending on the steering-holding determination state amount, to thereby calculate the steering assist torque.

2. The steering control device according to claim 1, wherein the steering assist torque calculation section corrects an input signal based on a magnitude of the steering-holding determination state amount, and calculates the steering assist torque based on the corrected input signal.

3. The steering control device according to claim 2, wherein, even when the steering-holding determination section does not determine that the steering system is in the steering-holding state, the storing section updates the steering-holding determination state amount to a predetermined value when the steering angle is equal to or smaller than a predetermined zero-determination threshold with which the steering angle is determinable to be almost zero.

4. The steering control device according to claim 2, wherein, even when the steering-holding determination section does not determine that the steering system is in the steering-holding state, the storing section updates the steering-holding determination state amount to a predetermined value when the steering angle is equal to or smaller than a predetermined zero-determination threshold with which the steering angle is determinable to be almost zero.

5. The steering control device according to claim 1, wherein, even when the steering-holding determination section does not determine that the steering system is in the steering-holding state, the storing section updates the steering-holding determination state amount to a predetermined value when the steering angle is equal to or smaller than a predetermined zero-determination threshold with which the steering angle is determinable to be almost zero.

6. The steering control device according to claim 1, wherein, even when the steering-holding determination section does not determine that the steering system is in the steering-holding state, the storing section updates the steering-holding determination state amount to a predetermined value when the steering angle is equal to or smaller than a predetermined zero-determination threshold with which the steering angle is determinable to be almost zero.

7. The steering control device according to claim 1, further comprising a vehicle speed detection section for detecting a vehicle speed of the vehicle,
wherein the steering assist torque calculation section calculates the steering assist torque based on the vehicle speed detected by the vehicle speed detection section.

8. The steering control device according to claim 1, wherein the steering assist torque calculation section limits a magnitude of the steering assist torque to be equal to or smaller than a predetermined value, which is such a magnitude that a driver is capable of steering the steering system while resisting the steering assist torque.

9. The steering control device according to claim 1, wherein the vehicle turning state detection section detects at least one of a steering torque of the steering system, a lateral acceleration of the vehicle, or a road surface reaction torque of the vehicle.

10. The steering control device according to claim 1, wherein the vehicle turning state detection section detects a yaw rate of the vehicle.

11. The steering control device according to claim 1, wherein the steering assist torque calculation section calculates a target return speed corresponding to the steering angle, and calculates the steering assist torque so that a steering speed of the steering system follows the calculated target return speed.

12. The steering control device according to claim 1, wherein the steering assist torque calculation section calculates a reference steering assist torque, which is determined based on a steering torque and a vehicle speed, and outputs the steering assist torque obtained by correcting the reference steering assist torque with the calculated steering assist torque.

13. A steering control method, comprising the steps of:
detecting a state amount representing a turning state of a vehicle, the state amount being a steering angle of the steering system;
determining a steering-holding state of a steering system based on a steering speed obtained from the steering angle;
storing the state amount, at a time when the steering system is determined to be in the steering-holding state, as a steering-holding determination state amount;
calculating a steering assist torque based on an absolute value of the steering-holding determination state amount;
controlling an actuator so that the actuator applies the calculated steering assist torque to the steering system of the vehicle; and
storing, in advance, at least first steering assist torque setting information, which affects the steering assist torque when the steering angle at time of the steering-holding state determination is small, and second steering assist torque setting information, which affects the steering assist torque when the steering angle at the time of the steering-holding state determination is large, and selecting or weighing the first steering assist torque setting information or the second steering assist torque setting information depending on the steering-holding determination state amount, to thereby calculate the steering assist torque.

* * * * *